United States Patent
Baratta

(10) Patent No.: US 11,154,944 B2
(45) Date of Patent: Oct. 26, 2021

(54) BLADE WITH REMOVABLE WORKING SURFACES AND METHODS OF MAKING AND USING

(71) Applicant: Baron Investments LLC, Oxnard, CA (US)

(72) Inventor: Anthony Baratta, Oak Park, CA (US)

(73) Assignee: BARON INVESTMENTS, LLC, Oxnard, CA (US)

( * ) Notice: Subject to any disclaimer, the term of this patent is extended or adjusted under 35 U.S.C. 154(b) by 0 days.

(21) Appl. No.: 15/752,374

(22) PCT Filed: Aug. 15, 2016

(86) PCT No.: PCT/US2016/047108
§ 371 (c)(1),
(2) Date: Feb. 13, 2018

(87) PCT Pub. No.: WO2017/031091
PCT Pub. Date: Feb. 23, 2017

(65) Prior Publication Data
US 2019/0001424 A1    Jan. 3, 2019

Related U.S. Application Data

(60) Provisional application No. 62/205,210, filed on Aug. 14, 2015.

(51) Int. Cl.
*B23D 61/02* (2006.01)

(52) U.S. Cl.
CPC ......... *B23D 61/023* (2013.01); *B23D 61/026* (2013.01)

(58) Field of Classification Search
CPC ............................ B23D 61/023; B23D 61/026
See application file for complete search history.

(56) References Cited

U.S. PATENT DOCUMENTS

| | | | |
|---|---|---|---|
| 299,142 A | 5/1884 | Hilton | |
| 646,284 A | 3/1900 | Hilton | |
| 869,574 A | 10/1907 | Huther | |
| 1,278,630 A | 9/1918 | Freas | |
| 1,306,741 A | 6/1919 | Blanchard | |
| 1,699,747 A | 1/1929 | McKay | |
| 2,221,735 A * | 11/1940 | Gommel | B23D 61/023 407/47 |
| 2,544,920 A * | 3/1951 | Fullerton | B23D 61/023 83/838 |

(Continued)

FOREIGN PATENT DOCUMENTS

EP    0605850    7/1994

OTHER PUBLICATIONS

Yitagesu, Dereje, Search Report, dated Oct. 25, 2016, 5 pages, WIPO International Search Authority, ISA Australian Patent Office.

(Continued)

*Primary Examiner* — Omar Flores Sanchez
(74) *Attorney, Agent, or Firm* — Henricks Slavin LLP

(57) ABSTRACT

Tools are described having removable working elements, include saws having removable cutting elements. Interface geometries on one or more of a core structure and removable elements may be simple or complex geometries. Securement elements releasably hold the removable elements in place.

26 Claims, 11 Drawing Sheets

(56) References Cited

U.S. PATENT DOCUMENTS

| | | | | |
|---|---|---|---|---|
| 2,670,766 | A | * | 3/1954 | Heinrich .............. B23D 61/023 83/838 |
| 3,282,263 | A | | 11/1966 | Christensen et al. |
| 3,307,242 | A | | 3/1967 | Cofran |
| 3,633,637 | A | | 1/1972 | Kolesh |
| 4,879,936 | A | | 11/1989 | Anderson |
| 5,408,983 | A | | 4/1995 | Sawluk |
| 5,761,981 | A | * | 6/1998 | Stoffels ................ B23D 61/023 241/294 |
| 5,829,423 | A | | 11/1998 | Benz |
| 8,464,622 | B2 | | 6/2013 | Chen |
| 8,495,942 | B2 | | 7/2013 | Rattunde |
| 2010/0058917 | A1 | * | 3/2010 | Scandroglio ........... B23D 43/04 83/840 |
| 2012/0132052 | A1 | * | 5/2012 | Chen ................... B23D 61/023 83/838 |
| 2019/0030754 | A1 | * | 1/2019 | Baratta ................ B23D 61/026 |
| 2019/0262919 | A1 | * | 8/2019 | Mattes ................. B23D 61/021 |

OTHER PUBLICATIONS

Yitagesu, Dereje, Written Opinion, dated Oct. 25, 2016, 7 pages, WIPO International Search Authority, ISA Australian Patent Office.
Popma, Ronald, Extended European Search Report, dated Apr. 26, 2019, 8 pages, European Patent Office.

* cited by examiner

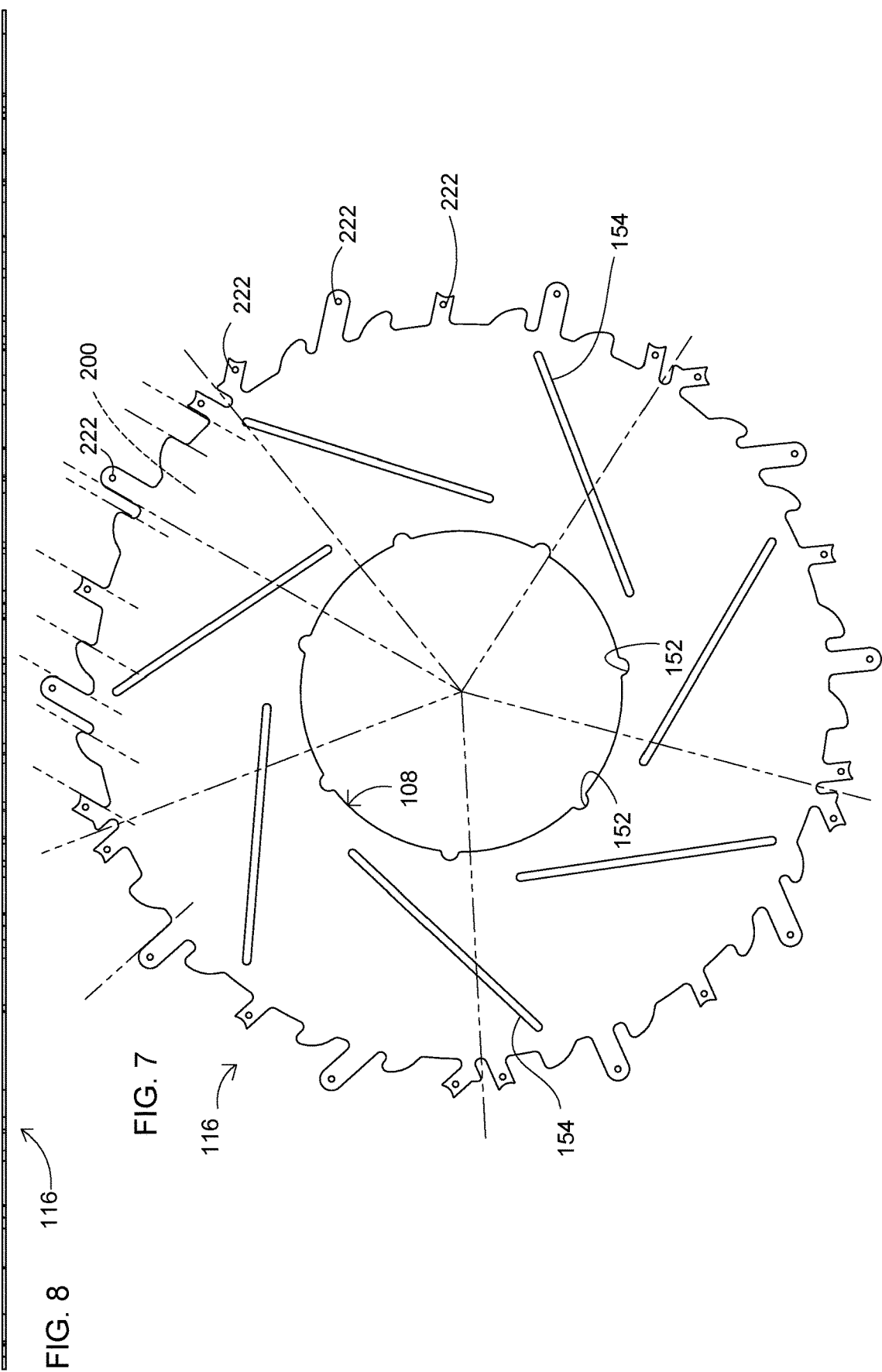

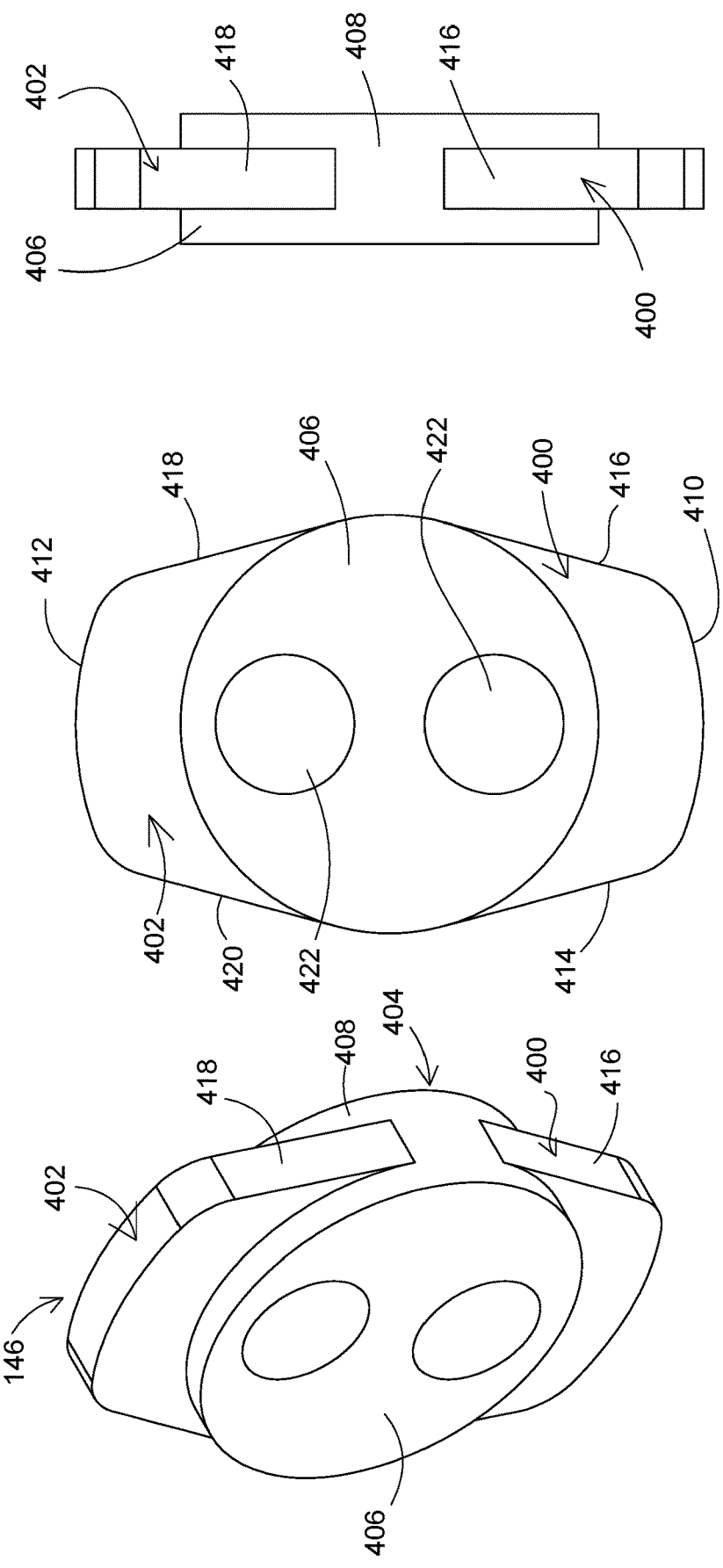

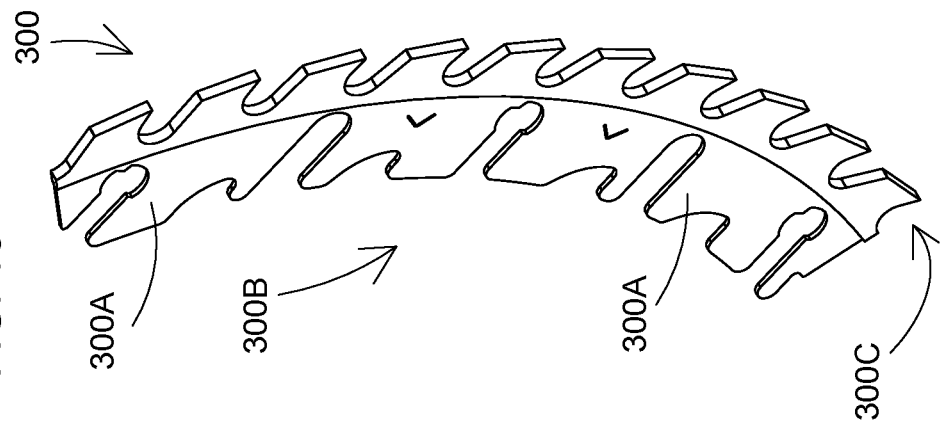
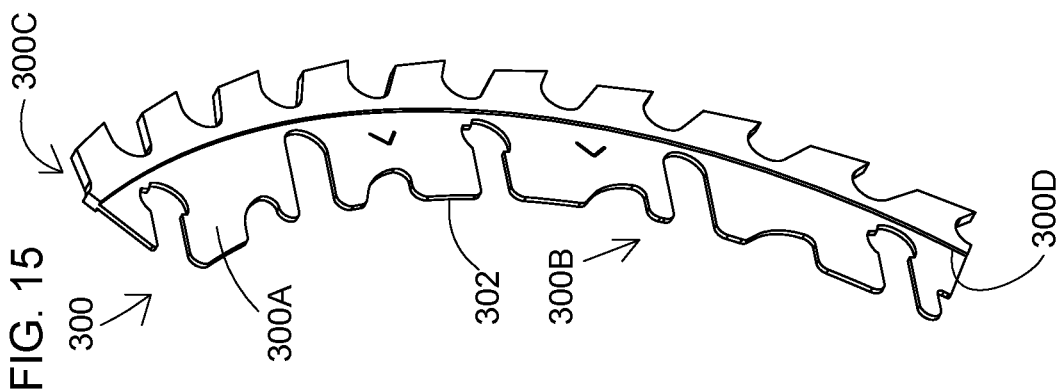

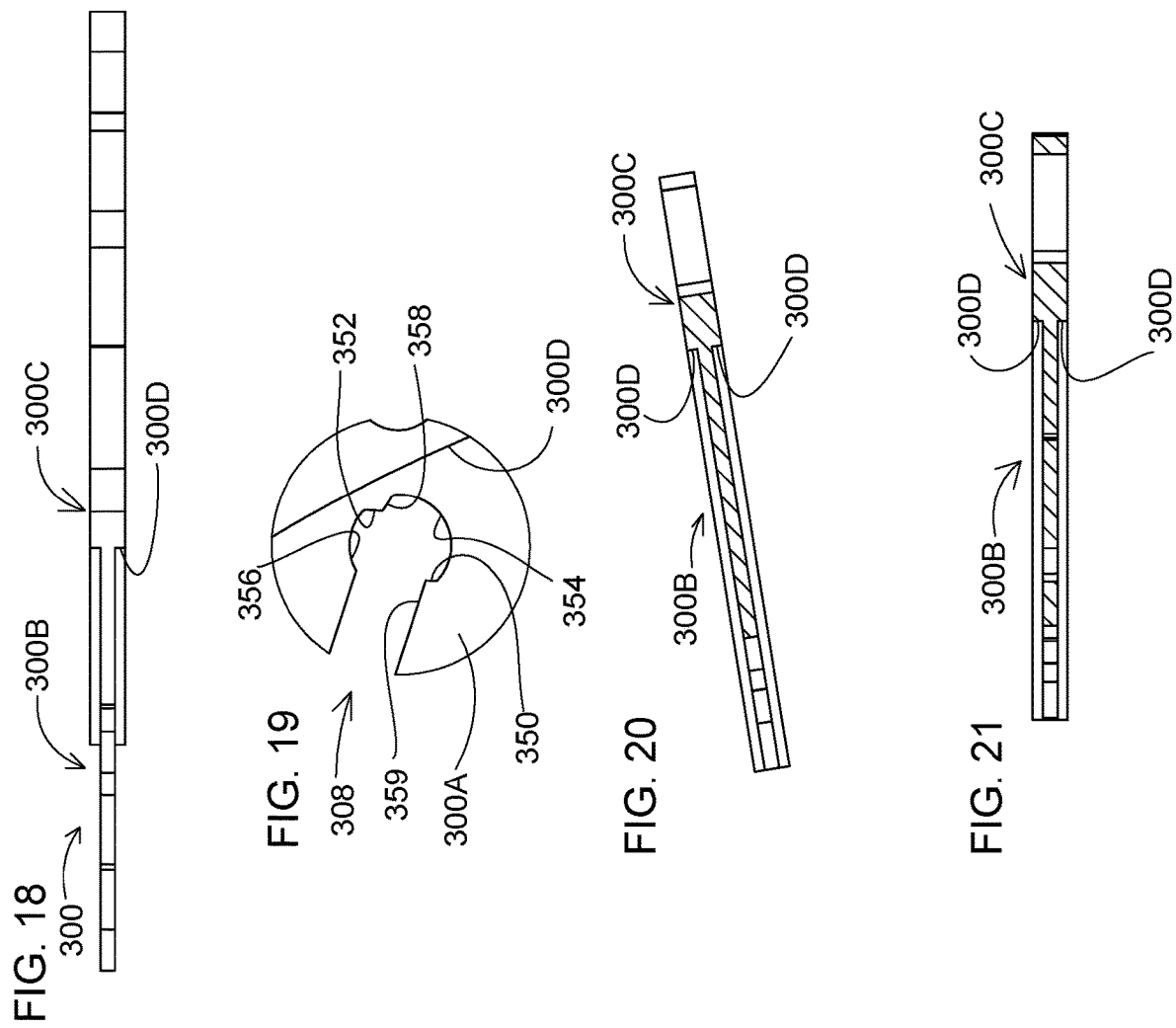

BLADE WITH REMOVABLE WORKING SURFACES AND METHODS OF MAKING AND USING

CROSS REFERENCE TO RELATED APPLICATIONS

This application is a National Stage of International Application No. PCT/US16/47108, filed Aug. 15, 2016, and is a non-provisional of and claims priority to U.S. 62/205,210, filed Aug. 14, 2015, the entire contents of which are incorporated herein by reference.

BACKGROUND

Field

This relates to tools for working on workpieces, for example cutting tools for cutting workpieces, and by further example, circular saw blades for cutting wood or concrete, and such tools having removable cutting components.

SUMMARY

Methods and apparatus are disclosed that may improve the lifetime of one or more components used with working tools, for example cores for and/or components used with cutting tools. Cutting tools using replaceable components, for example circular saw blades for which cutting components can be interchangeable, replaced or removed, allows continued use of the cutting tool without having to replace the complete tool when a part wears out or breaks. Interchangeable or replaceable components also allow more flexibility in using the tool, and also may reduce the number of different tools that an operator may want to have on hand.

In one example of a cutting tool having removable components, the tool includes a core having an interface geometry over a span or length of all or part of the tool for receiving one or more removable components. The interface geometry may take a number of configurations, and in one example, a component for the tool has a complementary geometry that fits the interface geometry so that the tool and the component fit together. In the examples of tools described herein, the component can be releasably secured to the tool. When the tool and the component substantially fit together, the respective interface geometries for the tool and the component would be considered substantially complimentary. For example, the core and the removable component are inter-engageable so that the component can be secured on the tool for normal operation. The component can be releasably secured on the tool so that the component can be removed if it becomes worn, broken, or if the operator wants to change the configuration of the tool, or for other reasons. As used herein, "span" can be linear or arcuate or otherwise nonlinear, and an interface geometry extends over a span. Part of an interface geometry extends over a sub-span.

In a further example of a cutting tool having removable components for a core having an interface geometry over a span or length of all or part of the tool, the interface geometry may be repeated along or about the tool so that a plurality of components can be mounted on the tool for operation. In the examples of tools described herein, the interface geometry repeats over the perimeter of the tool. In an example of a circular saw blade, the interface geometry can be repeated an integer number of times, for example so that a given component can be placed on or engaged with the interface geometry at any one of the integer number of locations. Additional identical or even different components can be placed at the remaining locations to form the tool. In one example, the integer is an even number, but can also be odd.

In another example of a cutting tool having removable components for a core having an Interface Geometry over a span or a length of all or part of the tool, the interface geometry may take a number of forms. In one example, the interface geometry may be straight or may be curved or may be circular, for example a circular perimeter portion on a circular saw blade, or a straight portion on a straight saw blade. In another example, the interface geometry may be a uniform or repeating geometry, for example a saw tooth, sinusoid, crenellated, or other simple repeating waveform. In a further example, the interface geometry may be more complex with repeating or non-repeating form or forms in the interface geometry, and the forms may be reversible beginning to end or non-reversible, symmetric or asymmetric about a midpoint between the beginning and the end. While it is possible that the entire core has a complete interface geometry that is non-repeating, a core having an interface geometry that repeats at least once allows identical components to be placed across respective portions of the core, where the interface geometry repeats. In the example of a circular saw blade, for example, the interface geometry may be present in an odd number of times (once and repeated an even number of times) to reduce the possibility of generating harmonics or other vibrations. In another configuration, for example in a circular saw blade, one interface geometry in a span is not diametrically opposite another interface geometry in its span.

In an example of a cutting tool having removable components for a core having an interface geometry over a span or length of all or part of the tool, the interface geometry and a component for the tool has an exactly complementary geometry that fits the interface geometry substantially precisely. Such a complementary fit can maximize the drive applied to the component by the core, and reliably distributes load from the component to the core. Alternatively, the complementary fit can be less than 100% and still provide an acceptable support for some applications. For example, less than 100% complementary fit may occur when there are gaps between adjacent surfaces of the core and the component.

In a further example of a cutting tool having removable components for a core having an interface geometry over a span or length of all or part of the tool, the core interface geometry and a geometry of a complementary component will match. In one example, the core interface geometry will be defined as desired, and the geometry of the component will be selected so as to provide the desired complementary fit. In another example, the core interface geometry and the geometry of the component can be reversed, so the geometry that would otherwise have been configured to be placed on the core as the interface geometry is incorporated into the component, and vice versa. In one example, an interface geometry can be configured or designed for the component, and the complementary configuration can be incorporated into the core to provide the desired fit. In any of the descriptions herein of an interface geometry, in the context of a core, the same interface geometry can be incorporated into the component, and the complement incorporated into the core, and vice versa.

In one example of an interface geometry described herein, the interface geometry includes at least one solid geometry having a plurality of surface geometries wherein at least three surface geometries in the plurality of surface geometries on a solid geometry are parallel to each other. When the interface geometry is arcuate or nonlinear, such as for a removable arcuate component or for a circular cutting tool, at least two of the at least three surface geometries are non-radial (though the three surface geometries may be linear), and three of the at least three surface geometries can be non-radial (or more or all of them when there are more than three surface geometries), depending on the interface geometry. In one configuration, two, and in other configurations three, of the at least three surface geometries that are parallel are also non-colinear and non-coplanar. In another configuration, the at least one solid geometry has a plurality of surface geometries some of which are straight and some of which are curved and/or angled. For example, straight surface geometries may extend parallel to each other while curved and/or angled surface geometries may be nonparallel, non-collinear and non-coplanar with the straight surface geometries. In a further configuration of an interface geometry, the interface geometry may include a plurality of solid geometries wherein one or more of the plurality of solid geometries are different from at least one other of the solid geometries in the plurality of solid geometries. For example, a first solid geometry in the interface geometry may include a first arrangement of surface geometries, and a second solid geometry in the interface geometry may include a second arrangement of surface geometries different from the first. The first and second arrangements of surface geometries may be different in terms of the types of surface geometries, the number of surface geometries, the relative spatial arrangement of the surface geometries, or otherwise. In one example, for example on a removable component, an interface geometry may include four solid geometries wherein each of the four solid geometries have outside or lateral surface geometries parallel to each other, and where adjacent solid geometries have facing surface geometries parallel to each other. In a further example, for example on a removable component, an interface geometry having four solid geometries may also include respective boundary solid geometries, wherein each boundary solid geometry has at least one surface geometry parallel to surface geometries on other solid geometries in the interface geometry.

An interface geometry includes one or more solid geometries and may further include one or more surface geometries, though solid geometries may be configured to be combined to define an entire interface geometry. A given solid geometry includes a plurality of surface geometries. As described herein, a given solid geometry will generally have a side profile (as viewed from a side of the component) of a given geometry with lateral or side surfaces that are generally flat or planar in an example where the component is used in a circular saw blade, for example. However, in other applications, the lateral or side surfaces can be other than flat or planar.

In a further example of an interface geometry described herein, the interface geometry includes a plurality of solid geometries wherein at least one surface of each of the solid geometries in the plurality of solid geometries is parallel to at least one surface in another of the solid geometries. In one example of a plurality of solid geometries wherein at least one surface of each of the solid geometries in the plurality of solid geometries is parallel to at least one surface in another of the solid geometries, there are at least three surfaces that are parallel to one another, and the at least three surfaces are on at least two solid geometries in the plurality. In one configuration in the immediately foregoing example, two of the parallel surfaces may be on the same solid geometry and the third on a second solid geometry. In another example, the parallel surfaces extend outward from the core. In another example, the parallel surfaces are on respective geometries adjacent to each other, for example on the same solid geometry or on separate solid geometries. In a further example, the parallel surfaces are on respective solid geometries (for example solid geometries of the core) separated by at least one additional solid geometry. In another example, the respective geometries on which the parallel surfaces occur repeat within a defined span or length of all or part of the core. In one configuration, the respective geometries on which the parallel surfaces occur include linearly-extending solid geometries, for example fingers or linear tabs, extending parallel to each other and away from a baseline or reference. There may be more than two linearly-extending solid geometries having parallel surfaces within a given defined span or length of all or part of the core. In one example, a given span or length of all or part of the core includes five such linearly-extending solid geometries. In another example of an interface geometry described herein, for a circular blade, one or more solid geometries having at least one parallel surface has the at least one parallel surface on a leading edge of the geometry, where the leading edge is the edge leading in the direction of rotation of the circular blade. A further example for a circular blade has a plurality or all of the leading edges on the solid geometries parallel to each other in the interface geometry. Parallel surfaces on solid geometries and parallel linearly-extending solid geometries (for example fingers or linear tabs) help to reliably receive, support and absorb loading from arcuate components extending over the span of the core. Interface geometries in any of the examples described herein may repeat, as desired.

In another example of an interface geometry described herein, a span contains non-repeating geometries spanning an arc or length, and at least two geometries point or are directed in the same direction, and have at least one respective surface parallel to the other. In one configuration, the at least two geometries point or are directed outward of the core. In an example of a circular saw blade, two geometries may be extending in the same or similar directions and make different angles to respective radii intersecting the geometries. Put another way, two solid geometries may be extending in the same or similar directions and make different angles to a common baseline or reference to which the respective solid geometries are closest.

In a further example of an interface geometry described herein, the interface geometry includes a plurality of solid geometries wherein at least one surface of each of the solid geometries in the plurality of solid geometries is parallel to the at least one surface in another of the solid geometries, and the related solid geometries include both straight and curved surfaces in the profiles. In one example, respective surfaces in each of the related solid geometries are straight and parallel to each other, and other respective surfaces in each follow a curve. In a further example, the related solid geometries have fin-shapes, for example with a convex surface and a straight and/or a concave surface.

In another example of an interface geometry described herein, different solid geometries can be combined to form the desired interface geometry along a span or length of all or part of the core. For example, solid geometry forms can be mixed. In one configuration, an interface geometry in a span or length can include such solid geometries as fingers and fins arranged among each other, alternating one to the other, or in other combinations. In a further configuration, two or more of the solid geometries within a span can have respective surfaces parallel to each other. In any of the interface geometries described herein, an interface geometry can be defined for a span or a length, and then repeated over all or less than the entire span or length of the core as desired.

In an additional example of an interface geometry for a span or length of all or part of a core, a plurality of solid geometries form a perimeter profile over the span, and at least two different geometries forming part of the perimeter profile within a sub-span or portion of the span results in a combined geometry. In one configuration, the combined geometry is not repeated over the span. In another configuration, the combined geometry includes a first solid geometry that is repeated, but without repeating the combined geometry within the span. In a configuration where a first solid geometry of a combined geometry is repeated, the repeated solid geometries can be adjacent each other, or separated by another solid geometry. Additionally, the interface geometry defined by the span or the length can be repeated, wherein the solid geometries within the interface geometry have the described characteristics.

In any of the examples described herein, a span or length of all or part of a core for which an interface geometry is defined can correspond to a single working element, such as a cutting element, for example a carbide tip or diamond segment, or to a plurality of working elements. Where a span or length of all or part of a core supports a plurality of working elements, a complete tool can be assembled with fewer piece parts, or with a smaller number of total components. In the example of a circular saw blade, the greater the span corresponding to the interface geometry, the more it is desired to ensure that the complementary component fits easily and well to the interface geometry on the core. An arcuate span over a significant length makes it more difficult to interface components due to curvature of the core.

In another example of a cutting tool, the tool includes a core having an opening, for example a center opening, for mounting the tool on a drive system, for example a saw, for supporting and driving the tool. The core may include a circular opening for receiving and in which is fixed a spline drive insert. The insert may have a profile conforming to an external profile of a drive element on the saw. In one configuration, the profile is a consistently or repeating varying curve, such as a sinusoid, extending completely around the opening. The insert can be secured in the opening of the core by, for example, rivets, removable fasteners, such as bolts, or other means. In another configuration, the insert can be formed as a fixed and secured base fixed in the core and removable sections removably secured in the base to allow the sections to be interchangeable, replaced or removed if they become damaged or worn. The sections can be secured in place in ways similar to those described herein with respect to the carrier, for example with releasable locking elements, fasteners, latches or other releasable securements.

A core can be used with any of the additional components described herein, and take a number of configurations. A core can be formed from a single sheet of material and carriers mounted thereon for working a workpiece. Alternatively, and as described herein, the core can be formed from a plurality of lamina of the desired material and dimensions. The lamina can be formed such as by stamping, cutting, laser cutting or similar methods and secured together with one or more of adhesive, fasteners such as rivets or bolts, spot welding, laser welding and the like. An insert can be sandwiched in the core opening between lamina, and secured either permanently or releasably. Strengthening members, for example rods, fibers, or other members can also be sandwiched between the lamina to strengthen the core. A perimeter portion of the core can be secured together as desired, for example by one or more of adhesive, rivets, fasteners and/or welding.

The cores described herein can include securement elements to help in securing carriers at one or more areas along the perimeter of the core. The securement elements can be sandwiched between lamina in the core, or otherwise attached or supported by the core. In one configuration, the securement elements are sandwiched between outer lamina. In another configuration, the securement elements are between lamina and are accessible through respective openings in the lamina. The lamina can be secured in the area of the securement elements by one or more of adhesive, fasteners such as rivets or bolts, spot welding, laser welding or the like. In one example, the securement elements are pivotable between locked or latched positions and unlocked or unlatched positions. The securement elements can have symmetric or asymmetric profiles or shapes, can include eccentricities for engaging adjacent surfaces, for example to secure carriers in place, and/or can include camming or other bearing surfaces for positioning adjacent structures in a desired location. The securement elements can be used to releasably secure carriers on the core.

The cores described herein can include a center core sandwiched between adjacent laminar layers. The laminar layers can be substantially circular in outer perimeter profile, or can take any number of perimeter profiles to provide the desired results. In one configuration, the center core has a center opening for receiving an insert for supporting the assembly on a drive element, for example a saw or grinder, and an outer perimeter having the desired interface geometry, for example interface geometries as described herein. In one configuration, the outer portions of the laminar layers extend at least partly or completely beyond the outer perimeter of the center core, thereby providing a cavity area or areas around the perimeter of the assembly between the laminar layers and outward of the center core perimeter surface. The cavity area or areas between layers can be configured to receive carriers around the outer perimeter of the core to form the working portion of the tool. The cavity area between layers would allow the outer perimeter portions of the laminar layers to sandwich portions of the carriers between them, and a remainder of the carrier would extend outward of the core for operating on a workpiece. Laminar layers and any center core may have edge or perimeter surfaces that extend in a direction substantially normal to the planar surfaces of the layer, such as may be formed by laser or water jet cutting. The edge or perimeter surfaces extend from one laminar surface to the opposite laminar surface.

Cutting components, for example for use with cutting tools as described herein, can take a number of configurations. Cutting components can be used on any of the tool configurations described herein, and may be fixed or removable relative to a core, for example. A removable component may have an interface geometry over a span or length for being supported on or engaging with a core, for example, or other support structure. One portion of the removable component forms a working portion, and another portion of the removable component forms a support structure for the working portion and for engaging or otherwise being supported by a core. The interface geometry for the removable component may take a number of configurations, including any of those described herein, and in one example, has a complementary geometry to the tool so that the tool and the removable component can fit together. In another example, the interface geometry for the removable component fits but is not 100% coincident or complementary to the geometry of the core.

In one example, the interface geometry of the removable component may be straight, arcuate, polygonal, or complex. In some configurations, the interface geometry may be a uniform or repeating geometry, such as a sawtooth, sinusoid, square wave, or other simple repeating waveform. In another example, the interface geometry may be more complex with repeating or non-repeating form or forms, and the forms may be reversible beginning to end, or non-reversible, symmetric or asymmetric about a midpoint between the beginning and the end.

In an example of an interface geometry for a removable component for a tool, for example a cutting blade, the interface geometry includes a plurality of solid geometries wherein at least one surface of at least one of the solid geometries in the plurality of solid geometries is parallel to at least one surface in another of the solid geometries, and non-colinear and/or non-coplanar. In one example, the parallel surfaces form walls of cavities extending into an interior of the interface geometry or of a profile of the removable component. For example, the cavities can be straight-walled pockets wherein the pockets extend parallel to each other and separate respective solid geometries. In another example, there may be parallel surfaces on respective solid geometries adjacent to each other. In a further example, such parallel surfaces can be on respective solid geometries separated by at least one additional solid geometry. In a further configuration, the respective solid geometries on which parallel surfaces occur will repeat within a defined span or length of the removable component, while in other configurations, respective solid geometries on which parallel surfaces occur will not repeat within a defined span or length of the removable component. In one example, the respective solid geometries on which the parallel surfaces occur include linearly-extending surface geometries, for example straight-walled cuts extending parallel to each other into or along a surface of the removable component. More than two linearly-extending solid geometries having parallel surfaces can occur within one component.

In another example of an interface geometry for a removable component for a tool, for example a cutting blade, the interface geometry includes at least one solid geometry having a plurality of surface geometries wherein at least three surface geometries in the plurality of surface geometries on a solid geometry are parallel to each other. Where the removable component is for a circular tool, at least two of the at least three surface geometries are non-radial but maybe linear, and where there are more than three surface geometries in the interface geometry, wall or fewer than all of the surface geometries can be parallel to each other and extend non-radially relative to a reference point of the circular tool. One or more of the surface geometries may also be non-collinear and non-coplanar. In another configuration, at least one solid geometry in an interface geometry has a plurality of surface geometries, some of which are straight and some of which are curved and or angled. Straight surface geometries may extend parallel to each other while curved and/or angled surface geometries may be nonparallel, noncollinear and non-coplanar with the straight surface geometries. In another configuration of an interface geometry for a removable component, the interface geometry may include a plurality of solid geometries wherein one or more of the plurality of solid geometries are different from at least one other of the solid geometries in the plurality of solid geometries. A solid geometry may include side or lateral surfaces defining surface geometries that are parallel to each other, and such surface geometries may also be parallel to the adjacent surface geometries on respective adjacent solid geometries. Adjacent solid geometries and their facing surface geometries may define cavities complementary to surface geometries on the tool on which the removable component is used.

In another example of an interface geometry for a removable component, the removable component includes non-repeating solid geometries along a span or length of all or part of the component. At least two geometries on the component point or are directed in the same direction, and have at least one respective surface parallel to another surface on a geometry. In one configuration, the at least two geometries point or are directed inward toward the interior of the removable component, and may be defined by one or more solid geometries.

In a further example of an interface geometry for a removable component, the interface geometry includes a plurality of solid geometries wherein at least one surface of each of the solid geometries in the plurality of solid geometries is parallel to at least one surface in another of the solid geometries. In one configuration, the related geometries include both straight and curved surfaces in profiles of the interface geometry. In one configuration, respective surfaces in each of the related geometries are straight and parallel to each other, and other respective surfaces in each follow a curve. In another configuration, the related geometries have fin-shapes.

In an additional example of an interface geometry for a removable component, different geometries can be combined to form a desired interface geometry along a surface of the removable component. For example, solid geometry forms can be mixed. In one configuration, an interface geometry can include solid geometries defining fingers or fins arranged among each other, alternating one to the other, or in other combinations. In a further configuration, two or more of the solid geometries on the removable component can have respective surfaces parallel to each other. In any of the interface geometries described herein usable on a removable component, the interface geometry can be complementary to all or a portion of a geometry on a supporting tool.

In another example of an interface geometry for a removable component, the interface geometry includes a plurality of geometries to form a perimeter profile over a portion of the removable component. In one configuration, at least two different geometries form part of the profile, or sub-profile, producing a combined geometry. In one configuration, the combined geometry is not repeated across the removable component. In a further configuration, the combined geometry includes a first geometry that is repeated, but without repeating the combined geometry on the removable component. In a configuration where a first geometry of a combined geometry is repeated, the repeated geometries can be adjacent each other, or separated by another geometry. Repeated geometries allow a carrier to be placed on any portion of the core on which it fits, for example more than one location.

In any of the examples described herein of a removable component, the removable component can include a single working element, such as a cutting tip or cutting segments, or it can include multiple working elements. Where the removable component includes a plurality of working elements, the removable component can provide a larger percentage of an effective working surface than one containing a smaller or fewer working elements.

In any of the examples described herein of removable components having an interface geometry or of a core having an interface geometry for supporting a removable component, the interface geometry may include one or more engagement surfaces for use in helping to lock or secure the removable component and a supporting structure relative to each other, for example the core of a cutting tool such as the saw blade. The engagement surfaces may be cavities, cam surfaces, inter-engagements, or the like. In one configuration, the engagement surfaces are complementary to the adjacent surfaces of a securement structure on the tool used to secure the removable component on the tool.

In any of the examples described herein of removable components, the removable component can include the interface geometry formed on a portion of the component that fits within or interior to a portion of a core. The interface geometry can be formed on a thinner portion of the removable component, and the working portion of the removable component, for example that having cutting segments or tips, may be thicker, wider or structurally more robust for strength and durability.

These and other examples are set forth more fully below in conjunction with drawings, a brief description of which follows.

BRIEF DESCRIPTION OF THE DRAWINGS

FIG. 7 is a plan view of an exemplary center core for use with the blade of FIG. 1.

FIG. 8 is a side elevation view of the center core of FIG. 7.

FIG. 12 is an upper isometric view of a securement element for the blade of FIG. 1.

FIG. 13 is a plan view of the securement element of FIG. 12.

FIG. 14 is a side elevation view of the securement element of FIG. 12.

FIG. 15 is a rear isometric view of a removable cutting element of the blade of FIG. 1.

FIG. 16 is a front isometric view of the cutting element of FIG. 15.

FIGS. 17 and 17A are plan views of the cutting element of FIG. 15.

FIG. 18 is an end elevation view of the cutting element of FIG. 15.

FIG. 19 is a detailed plan view of a portion of the cutting element of FIG. 17 taken at "19".

FIG. 20 is a transverse section of the cutting element of FIG. 17 taken along line 20-20 of FIG. 17.

FIG. 21 is a transverse section of the cutting element of FIG. 17 taken along line 21-21 of FIG. 17.

DETAILED DESCRIPTION

Figure 1:
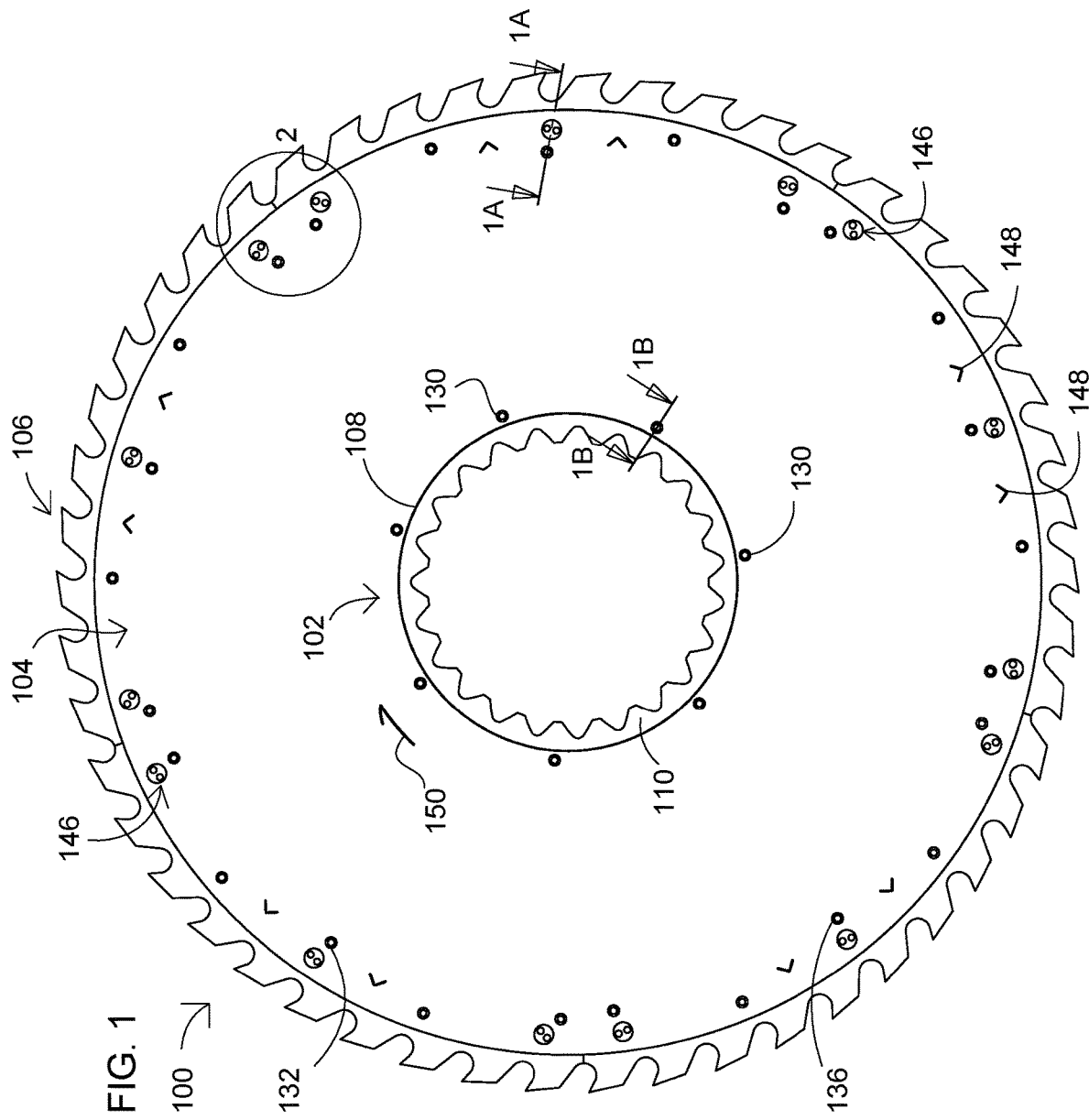
FIG. 1 is a plan view of an exemplary working tool, in the present example a circular saw blade.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of tools and of methods of making and using the tools are described. Depending on what feature or features are incorporated in a given structure or a given method, benefits can be achieved in the structure or the method. For example, larger tools may achieve longer lifetime and provide greater ease of use.

In some configurations of cutting tools, improvements can be achieved also in assembly, and in some configurations, a relatively small number of support structures can be used to provide a larger number of configurations of cutting tools. For example, in a circular saw blade, one or a few core configurations can be used to produce a number of saw blades having a larger number of final configurations.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of tool configurations and of methods of making and using the tools are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Saw blades are used as examples of a tool that can incorporate one or more of the features and derive some of the benefits described herein, and in particular wood or concrete saw blades. Tools other than wood and concrete cutting blades and equipment other than saws can benefit from one or more of the present inventions.

It should be understood that terminology used for orientation, such as front, rear, side, left and right, upper and lower, and the like, are used herein merely for ease of understanding and reference, and are not used as exclusive terms for the structures being described and illustrated.

As used herein, "substantially" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

Cutting tools and methods of assembling and using cutting tools are described herein as examples of tools for working on workpieces and wherein the cutting tools are particularly well-suited for using removable components, for example removable cutting components. The examples described will be related to circular saw blades, including wood blades such as that may use carbide cutting tips as the working component. However, it is understood that other tool configurations than circular blades, and other working configurations other than carbide cutting components can be used. One or more of the examples described herein can make it easier for operators to set up the desired cutting configuration, and inspect, maintain and repair the cutting configuration as desired.

In one example of a cutting tool (FIGS. 1-21), a circular saw blade 100 (FIGS. 1-4) includes a drive and support portion or hub 102, a core portion 104 and a working portion 106. Each of these elements of the cutting tool can take a number of configurations, but the present example will be described in the context of a wood blade. In the illustrated configuration, the hub 102 is formed by a circular opening 108 (FIGS. 1, 4 and 7) in the core 104 into which is placed and secured a hub insert 110 (FIGS. 1, 4 and 9-11). In other examples, the hub can be formed from a smaller opening than that shown in FIG. 1, can be other than circular, can have a different geometry for the insert 110, or can omit the insert entirely. The use of blade flanges on some saws can simplify the hub structure on a blade.

Figure 3:
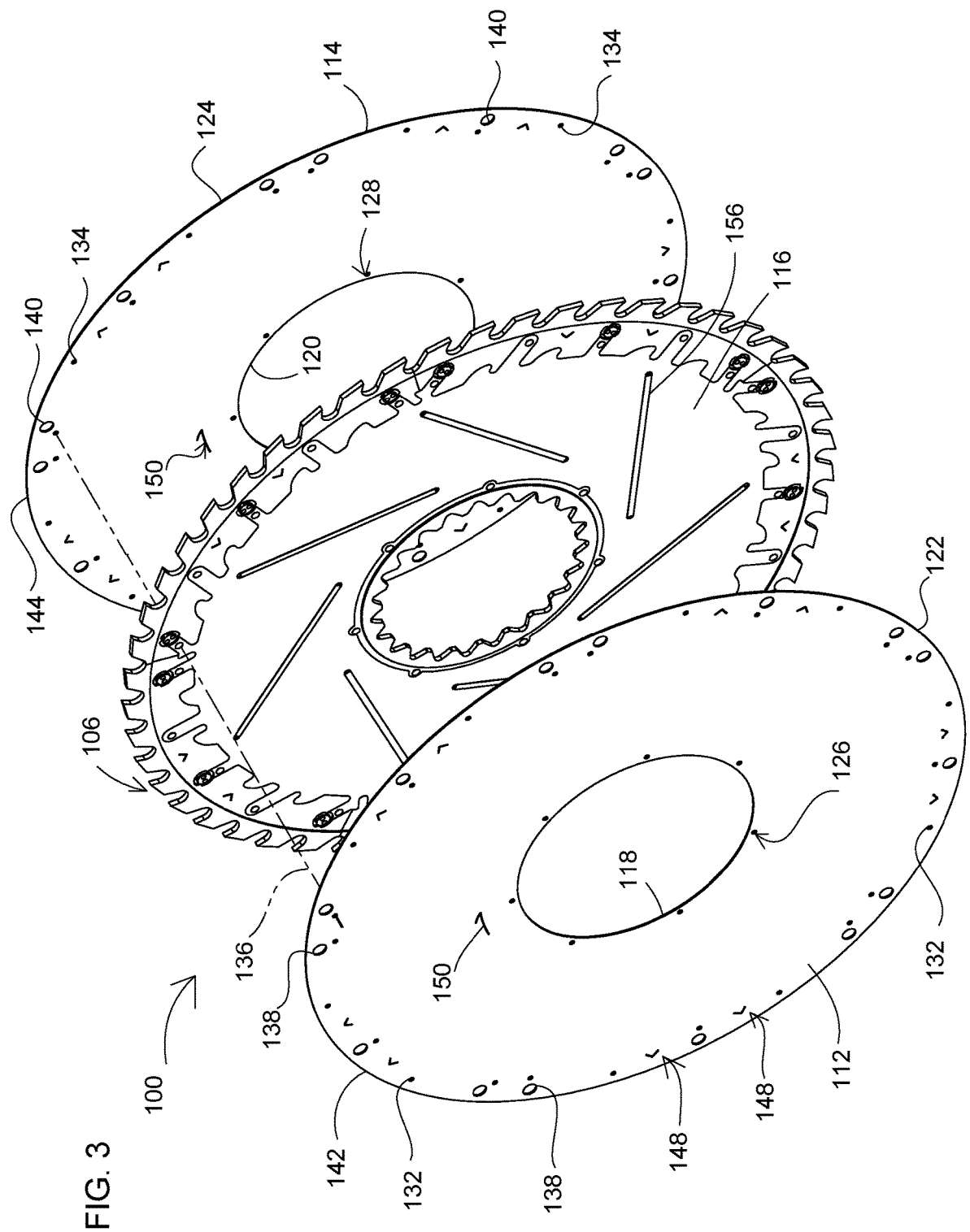
FIG. 3 is an isometric and exploded view of the blade of FIG. 1.
Figure 5:
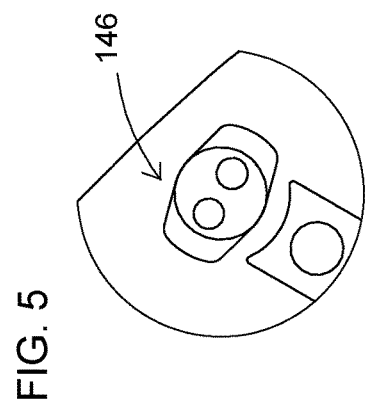
FIG. 5 is a detail view of a portion of the blade of FIG. 4 showing a portion of the blade core and a securement element.
Figure 6:
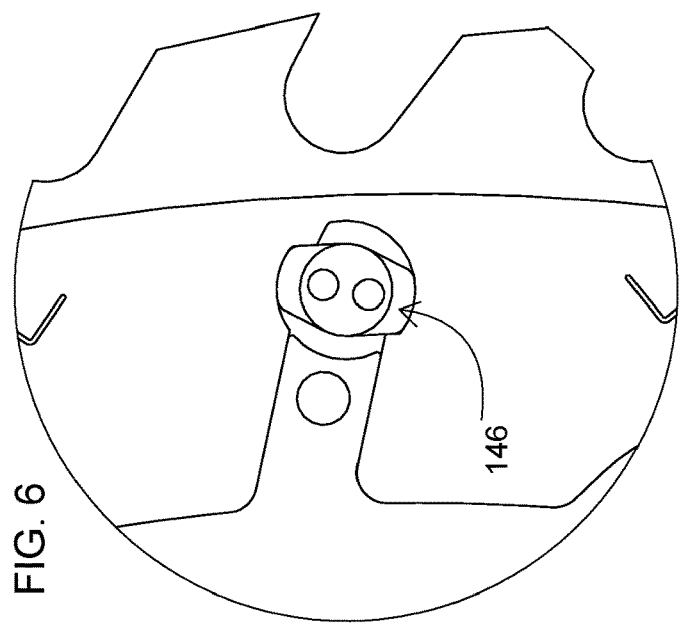
FIG. 6 is a detailed view of a portion of the blade in FIG. 4 showing a securement element engaged with a cutting element through a carrier for the cutting element.

The core 104 (FIGS. 1 and 3) is a laminar structure including a first laminar layer 112 on an outside of the core, a second laminar structure 114 on an outside of the core on a side opposite the first laminar layer, and a center core 116. The core 104 can be formed from a single piece of material, two lamina, three lamina as shown in FIG. 3, or more layers, as desired. The makeup of the core may depend on the application for the core, the core diameter, the operating speed, and/or other considerations. In the present example, the first and second laminar layers are relatively thin and sandwich the center core 116 and associated components between them. The first and second layers are formed from thin metal sheets, for example stainless steel, and help to protect the center core and its associated components. Each of the first and second layers include respective center openings 118 and 120, and respective circular outer perimeters 122 and 124. The outer perimeters 122 and 124 substantially define the outer extent of the core, and as indicated below, outer portions of the core between the first and second layers form a cavity or groove into which the removable cutting elements/components can be inserted and secured.

Figure 1A:
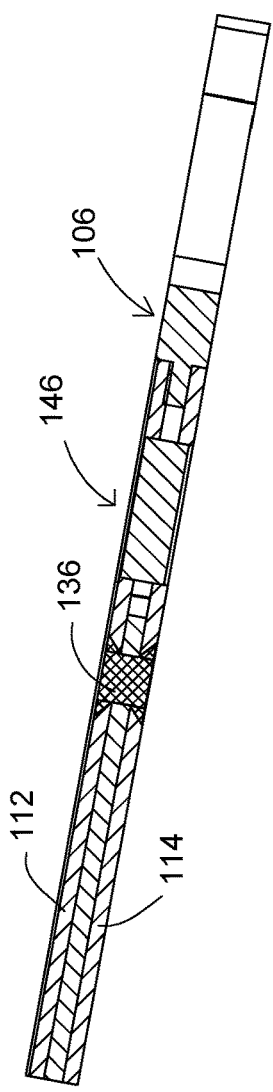
FIG. 1A is a partial transverse cross-section of part of a perimeter portion of the blade of FIG. 1 taken at 1A-1A.
Figure 1B:
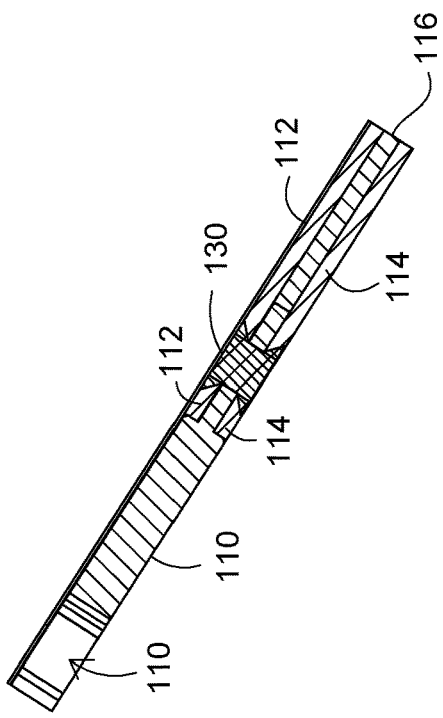
FIG. 1B is a partial transverse cross-section of part of an interior portion of the blade of FIG. 1 taken at 1B-1B.
Figure 2:
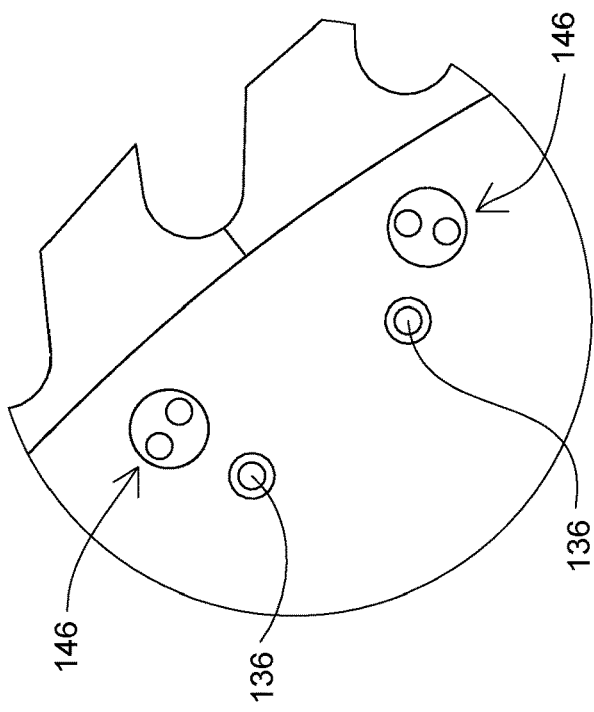
FIG. 2 is a detail of part of the blade of FIG. 1 taken at "2".

Each of the first and second layers include fastening or other securement openings 126 and 128, respectively (FIG. 3), each one to be aligned with a corresponding opening in the opposite layer. The openings receive fasteners, such as rivets 130 (FIGS. 1 and 1B). The rivets and the openings secure the hub insert 110 through corresponding openings in the hub insert. An odd number of rivets and corresponding openings are used to reduce the possibility of resonance or other forms of vibration. The rivets 130 and the openings secure the internal or interior portion of the core 104. Adhesives (not shown) may also be used to secure or fix the layers together, with or without fasteners or other securement.

Each of the first and second outer laminar layers are substantially uniform in thickness and surface configuration between the inner portion adjacent the hub 102 and the outer portion adjacent the working portion 106. Adhesive can be used on each of the laminar layers to secure those layers to the adjacent surface, for example to the center core 116. Fasteners can also be used, or instead of adhesive.

Each of the first and second layers include fastening or other securement openings 132 and 134, respectively (FIG. 3), each one to be aligned with a corresponding opening in the opposite layer. The openings receive fasteners, such as rivets 136 (FIGS. 1 and 1A). The rivets and the openings secure the outer layers and the center core in the area of the perimeter of the blade through corresponding openings in the center core. In the present example, the number and positioning of the rivets 136 correspond to linear extensions or fingers (described more fully below) in the center core 104. Adhesive (not shown) may also be used to secure or fix the layers together, with or without fasteners or other securement, at the perimeter portion of the core, and interior thereto. Alignment of one set of fastener openings is represented at 136A in FIG. 3. The core can be secured together with other arrangements of fasteners and openings, adhesive, welds or other securement.

The perimeter portion of each of the laminar layers 112 and 114 also include openings 138 and 140, respectively, formed adjacent the respective perimeter surfaces 142 and 144. In the present example, the openings 138 and 140 are circular, extending completely through the thickness of each layer. The openings 138 and 140 help to capture and position securement elements, for example locking elements 146 described more fully below. The securement elements help to position and secure corresponding removable working components, such as the components of working portion 106. The securement elements 146 are secured in their radial and axial positions relative to the blade by being sandwiched between the first and second outer laminar layers and positioned in their respective openings, while still being permitted to pivot or rotate, as desired. In the present examples, the securement elements 146 pivot within their respective openings.

As depicted in FIGS. 1-6, each securement element, such as locking element 146, has a rivet 136 or other fastening element closely adjacent. The closely adjacent rivets help to support the securement elements and the lamination about the securement elements. They accommodate loading that might be experienced in the area of the securement elements arising from impact against the cutting tips. Adhesive also helps to secure the lamination and absorb loading from impact against the cutting tips.

One or both of the outer layers 112 and 114 can include indicators useful for the operator. In one example, indicators 148 (FIGS. 1 and 3) are formed on, in or through one or more of the laminar sheets at various positions around a perimeter portion of the corresponding layer. In the present example, the indicators 148 are arranged in pairs, to correspond with a corresponding working element. The indicators 148 have the form of arrows or darts pointing outward, to be aligned with corresponding arrows or darts on a working element (FIGS. 15-17). The indicators 148 help to align the working element with a proper position on the perimeter of the core, for example where the core and working elements have respective interface geometries fitting a particular pattern, misalignment for which might prevent proper assembly/engagement or the most desirable assembly/engagement. Other configurations of indicators can be used, and size, position and/or orientation.

One or more of the outer layers may also include a direction or spin indicator 150 (FIGS. 1 and 3). The indicator 150 is used to properly mount the blade on the drive equipment for turning in the right direction.

The center core 116 (FIGS. 1 and 7-8) has the center opening 108 configured to receive the hub insert 110. The center opening 108 and the hub insert 110 are configured with respect to each other so that they optimally transmit the driving motion through the core to the working elements. In the present example, the circular opening 108 in the center core 116 includes semicircular cavities 152 for receiving complementary tabs of the hub insert (described more fully below). The center opening 108 and the hub insert 110 are configured to closely fit together so the rotation from the drive element is efficiently transmitted to the core.

The center core optionally also includes in the present example linear cavities, and in the present example, openings 154 (FIG. 7). Linear cavities are formed on, into or through the center core. The openings 154 are aligned with respective chords of a circle concentric with the center core. In the present examples, each linear opening is longer than it is wide. Also in the present examples, the linear opening extends a distance greater than the annular distance defined between the center opening 108 and the closest distance the outer perimeter comes to the center opening. The linear openings 154 receive and retain linear structures such as rods 156 (FIG. 3). Adhesive can be used in the layers to help hold the rods in place. The rods and the adhesive help to strengthen the core and the blade. The linear cavities and rods can also be omitted, or substituted by alternative strengthening configurations, such as fiber materials, or the like. The center core 116 may be formed from a suitable material, which may include stainless steel or other comparable materials, and may be formed by cutting such as by laser or waterjet cutting, stamping, machining or otherwise. In the present example, the center core 116 is thicker than the outer layers 112 and 114, and provides structural support for the core. As also illustrated herein, the center core provides support for releasably securable working elements and in the present examples a repeating interface geometry so that working elements having complementary interface geometries can be placed on the core at any of the locations of a complementary interface geometry.

The hub insert 110 (FIGS. 9-11) is a partially annular structure having an outer perimeter portion 158 and an internal profile 160. The outer perimeter portion in the present example includes a plurality of tabs 162 having a semicircular profile for complementing the semicircular cavities 152 in the center core (FIG. 7). Each tab includes a corresponding opening 164 extending completely through the tab for receiving corresponding rivets or other fastening elements for securing the hub insert within the laminar structure of the core. The outer perimeter portion 158 is a thinner planar portion intermediate an envelope thickness defined by the upper and lower surfaces 166 and 168 (FIG. 10) of the hub insert. The outer perimeter portion 158 is sandwiched between adjacent layers of the first and second outer laminar layers 112 and 114 and secured in place by the rivets 130 (FIG. 1A). The outer perimeter portion 158 is recessed below the adjacent upper and lower surfaces 166 and 168 of the hub insert a thickness approximately equal to the thickness of the corresponding first and second outer laminar layers. Adhesive can also be applied between the adjacent portions of the outer laminar layers and the outer perimeter portion.

In the present example, the hub insert includes a spline structure 170 having a plurality of grooves 172 around the interior of the hub insert. The grooves 172 receive and extend over corresponding splines on a drive shaft. The hub insert and therefore the blade rotate with the driveshaft. Other center configurations can also be used for transmitting drive motion from drive equipment to the blade.

In the illustrated example of the center core 116 (FIGS. 7-7A), the center core includes an interface geometry about a perimeter of the center core for receiving removable components, for example the removable cutting elements of the saw (described more fully below). In the present example, the interface geometry is incorporated in the center core, but the interface geometry can be made part of any component or components forming a core, for example if a center core is omitted from the structure. While an interface geometry can take a number of forms, such as circular, simple geometries such as a sawtooth, sinusoid, square or other repeating simple waveform, complex geometries are also possible. Additionally, an interface geometry may be defined for a portion of the core and then the geometry repeated over the remainder of the core. In the present example illustrated herein, the core is divided into five pie-shaped sections of equal size. The angle of each section, and therefore the arc length at a perimeter portion of each section is the same for each section. The core has an odd number of sections to reduce the possibility of resonance or other vibrations developing during use.

As discussed more fully below, the removable working elements are inter-engageable with the core at respective perimeter locations about the core. Where the interface geometries for all sections are identical, a given removable working component fitting one section can also fit each of the others. In the illustrated configuration of FIGS. 7 and 7A, the interface geometries for each section are identical, and the characteristics of only one of the interface geometries will be described in detail. The structures and functions in the present example of the interface geometries are identical. With a circular core and a complex interface geometry, the interface geometry is repeated an integer number of times, in the present example for a total of five sections and five identical interface geometries. Therefore, no section is exactly diametrically opposite another section.

In the illustrated example (FIGS. 7-7A), a section 200 is illustrated as originating at the center of the core and extending outward to an outer perimeter. The outer perimeter of the core is defined by the perimeter surface 202 of the core, and an outer perimeter portion of the core may be defined as falling within an arcuate band or annulus having an outer-most extent defined by an outermost point on the core, in this example perimeter surface 202. In the present example, the outermost point on the core is determined by at least one point in each section of the core. The arcuate band has an inner most position that may be defined by an innermost point on the perimeter surface, which in the present example falls on an imaginary circle 202A passing through a significant portion of the perimeter surface of the center core. In the present example, the interface geometry includes the innermost perimeter surface and extends outward therefrom. In other examples, the interface geometry may extend internal to the imaginary circle of the present configuration, for example either partially or completely. In an example where the interface geometry extends completely internal to the imaginary circle, the interface geometry would be defined by the perimeter surface of the core falling on the imaginary circle and cavities or grooves extending into the core from the imaginary circle, as distinguished from structures extending away from the center core. The imaginary circle 202A can be considered a baseline for reference with the solid geometries forming the interface geometry.

Figure 7A:
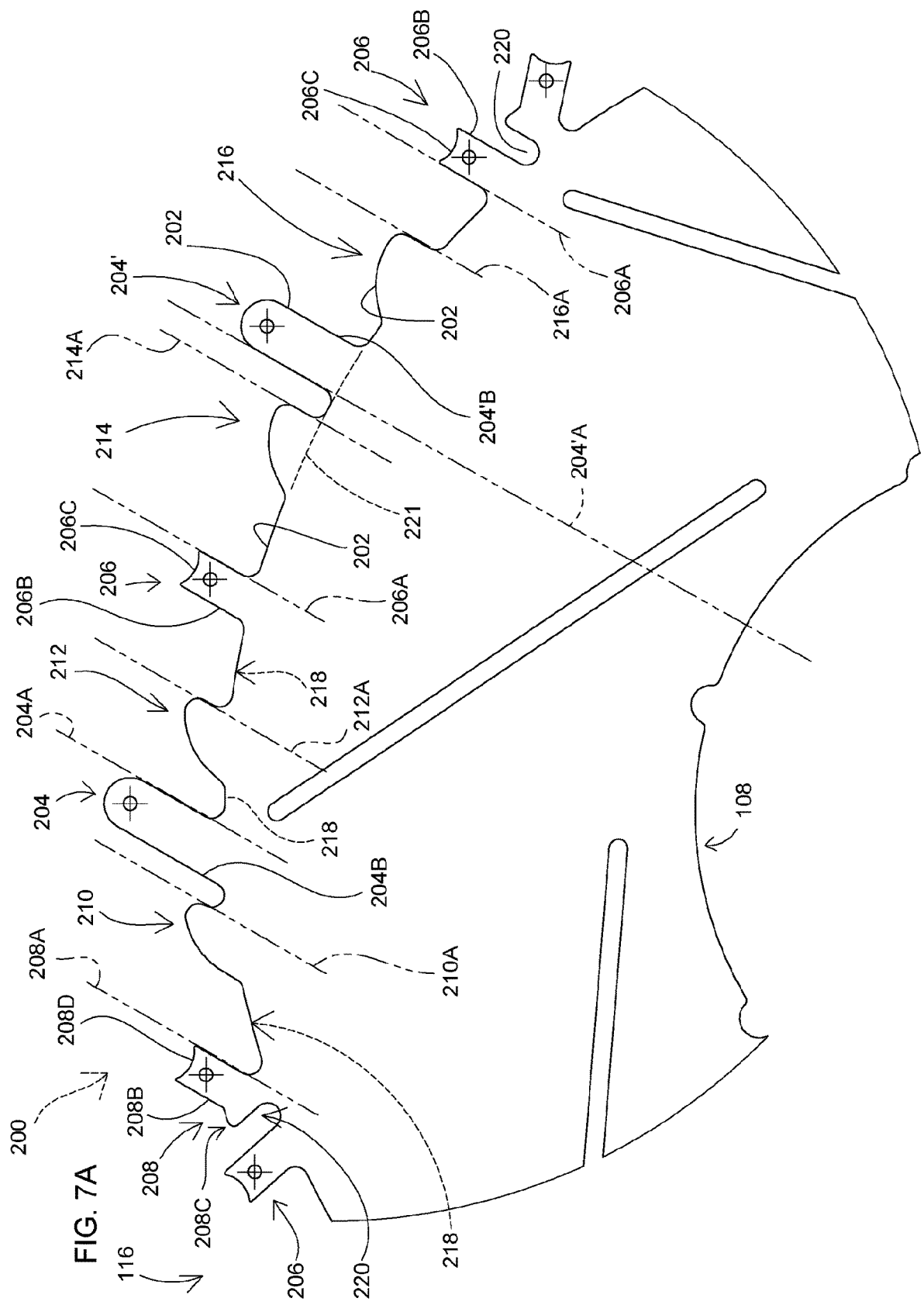
FIG. 7A is a detail view of a portion of the center core shown in FIG. 7.
Figure 10:
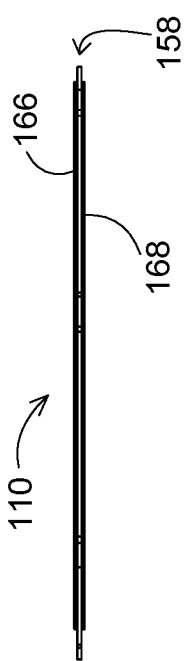
FIG. 10 is a side elevation view of the insert of FIG. 9.
Figure 11:
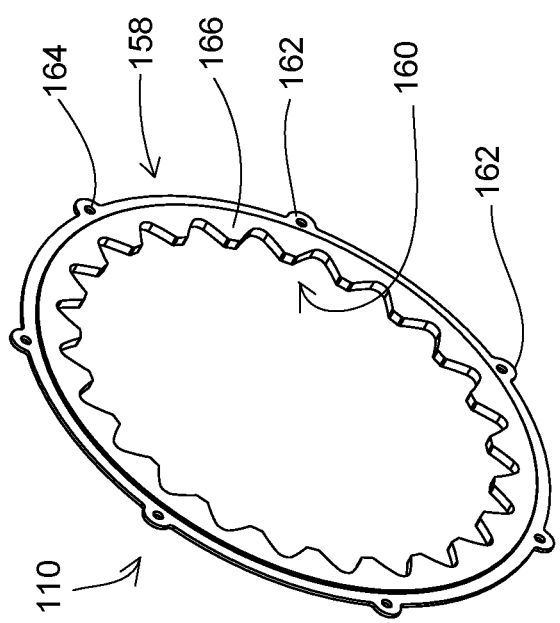
FIG. 11 is an isometric view of the insert of FIG. 9.
Figure 9:
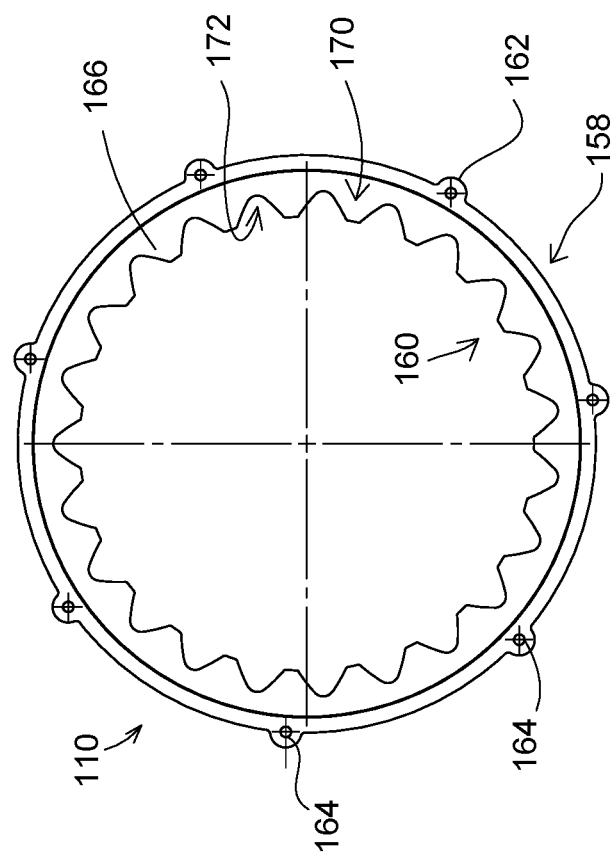
FIG. 9 is a plan view of a center insert element for the blade of FIG. 1.

In the example of an interface geometry shown in FIGS. 7-7A, the interface geometry includes a plurality of individual solid geometries and their associated surface geometries, where a given surface geometry forms part of a surface of a respective solid geometry. A solid geometry may have a plurality of surfaces forming respective surface geometries, where a respective surface geometry may have a simple shape (linear, curved, angled) or may have a more complex shape (multiple, non-repeating angles, curves, and/or lines that might be modeled with a complex equation). A simple surface geometry may be one that is easily recognizable to a casual observer, and may be a straight line, a simple curve, including a semi-circle, a single angled surface, and the like. In the present examples, individual geometries are distinguishable by one or more of shape and size, for example, and relative orientation, such as relative to an adjacent core surface, a base line reference such as an imaginary line from a common reference such as a center point or a center line, or relative to another geometry in the interface geometry. In one example, a geometry may be a finger 204, and in another example, a geometry may be a truncated finger or slat 206. In a further example, a geometry may be an angled slat 208, a short fin 210, a longer fin 212, and/or wider fins 214 and 216 (somewhat wider than fins 210 and 212). Other geometries can also be used, for example in addition to the present geometries, or instead of the present geometries or other combinations thereof. As noted above, the present geometries extend outward from core. Alternatively, one or more of the individual geometries can extend inward into the core from the circular perimeter surface, or all of the geometries can extend inward.

In the example of the interface geometry shown in FIGS. 7-7A, at least one, or several and in the present example all of the individual geometries in the interface geometry of the section 200 and have at least one surface extending outward from the core parallel to another surface in the interface geometry. Examples of parallel surfaces are represented by the phantom lines, for example 204A, 206A, 208A, etc. Additionally, the fingers 204 and 204', slats 206, and angled slat 208 have a plurality of parallel extending surfaces, for example 204B, 206B and 208B (FIG. 7A). Also in the present example, the opposite sides of the fingers 204 and the slats 206 extend parallel and substantially straight to the circular perimeter portion 218 of the core (while providing a smooth, curving transition to the perimeter). One parallel side represented by 208A of the angled slat 208 extends straight to a curving transition to the perimeter 218, while the opposite parallel side 208B extends to an angled heel 208C, extending outward from the angled slat 208 in the direction of the next adjacent section, and then turns inward to the circular perimeter 218. The heel 208C forms a cavity 220 between it and the next adjacent slat 206 in the next adjacent section.

The parallel surfaces in the section 200 are depicted in FIGS. 7-7A as being parallel to each other. However, it should be understood that one or more surfaces can be parallel among themselves, but not necessarily parallel to others in the interface geometry. In other examples, surfaces are not parallel to any significant extent. In the present example, surfaces on each of the geometries 204-216 are parallel, and extend outward from the core. As a given geometry is adjacent another geometry in the illustrated example, each geometry has a surface that is parallel to a surface in an adjacent geometry. Additionally, at least two adjacent geometries have their closest surfaces parallel, for example 204B and 210A. Conversely, the surfaces 204A and 212A on adjacent geometries are not the closest surfaces in those geometries. Additionally, in the present interface geometry, the parallel surface 204A on the one hand and the parallel surfaces 206A and 206B on the other hand are separated by the intermediate geometry 212.

Furthermore, fingers 204, 204', 206 and 208 represent five substantially straight, linearly extending geometries outward of the core. The fins 210-216 also represent a group of similar individual geometries, for example having respective straight (and parallel in the present example) sides and curved sides. Therefore, different individual geometries can have different characteristics, but still have surfaces parallel to each other.

It is also noted that in the configuration illustrated in FIGS. 7-7A, at least one of the surfaces identified as representing a parallel line is on a leading edge of the individual geometry, given that the direction of rotation 150 is as indicated (FIG. 1) for this circular blade. Moreover, each individual geometry in the interface geometry has its leading edge at least partly flat and parallel to the leading edges of a plurality of the other individual geometries, and as illustrated parallel to all of the leading edges in the interface geometry. Consequently, for the direction of rotation, much of the loading from the cutting element at any given circumferential position is applied to the nearby leading surface(s) on the individual geometries.

In the present example, one surface on the finger 204', namely that represented by phantom line 204'A, is on a radius of the circular core. In other configurations, another of the parallel surfaces can be selected to be on a radius, or alternatively, the geometries can be selected so that no parallel surface is on a radius. It is noted that for a given parallel surface on a radius, none of the other parallel surfaces in the section would be on a radius. Consequently, a removable working element such as a cutting element would more easily fit onto the geometries in the interface geometry given the arcuate characteristic of the perimeter portion of the core and typical linear movement of the cutting element into engagement with the interface geometry. In an alternative configuration, the cutting element could be positioned relative to the interface geometry so that one portion is adjacent or in contact with a corresponding portion of the interface geometry, and then pivoted into place to completely engage the interface geometry. Other assembly configurations are possible.

In the present configuration of the interface geometry, represented in section 200, a first individual geometry can be paired with a second individual geometry over a sub-span or portion of a span defined by a section 200, for example, to produce a combined geometry. For example, a finger 204 and fin 210 can form a combined geometry extending over a sub-span between the angled slat 208 and the adjacent fin 212. The combined geometry of a fin and a finger can be repeated at other locations along a span of the section 200. For example, fin 214 and finger 204' form a combined geometry. Alternatively, slat 206 and fin 214 can form a combined geometry, but that combined geometry is not repeated within the section 200 in the illustrated examples.

As can be seen by comparing FIGS. 3 and 7A, the fins 210-216 have straight and parallel surfaces facing in the direction of blade rotation. Such parallel surfaces help to support the cutting elements in place when the loading against the cutting elements would otherwise tend to lift the cutting element away from the core. Additionally, the finger having the parallel surface 204'A on a radius is closer to the leading edge of the section and therefore the leading edge of the interface geometry. With this configuration, a larger number of parallel surfaces on the individual geometries form an acute angle with a tangent 221 (or a perpendicular line) to the radius represented by 204'A, than the number of parallel surfaces on the individual geometries forming a right or obtuse angle with the same tangent. This characteristic of the interface geometry reduces the possibility that loading on a cutting element will tend to lift the cutting element away from the core perimeter. Given that the line 204'A is perpendicular to the tangent to the circle where the line 204'A crosses, the preceding surface 204B, parallel surface 216A and the parallel surface 206B are not perpendicular to a tangent where the respective parallel surfaces would cross the circle 218, but instead form an obtuse angle to their respective tangent lines. Conversely, the parallel surfaces (214A, 264A, 204A, 210A, and 208A) behind the line 204'A are not perpendicular to a tangent where the respective parallel surfaces across the circle 218, but instead form an acute angle. Therefore, there are more parallel surfaces forming acute angles with their respective tangents (five) than there are parallel surfaces forming obtuse angles with their respective tangents (three). Given the direction of rotation of the blade, loading on the cutting element will generally force the cutting element down and against the parallel surfaces of the individual geometries. Such loading will tend to reduce any loading on any securement elements holding the cutting element in place on the core. It is desirable to have at least one more leading surface forming an acute angle than there are leading surfaces forming obtuse or right angles Each of the linearly-extending individual solid geometries (fingers, slats and angled slats) include openings 222 (FIG. 7) to facilitate fastening the laminar layers together with the center core, but one or more solid geometries can omit openings for securement. The fingers 204 and 204' are configured in the present example to extend to the outermost limit of the center core, to be as close as possible to the working portions of the cutting element. Rivets or other fasteners securing the first and second outer laminar layers and the center core through the openings 222 provide strength at the outer-most portion of the perimeter portion of the core. The openings 222 on the slats and angled slats strengthen that portion of the perimeter of the core adjacent the securement elements (146 described more fully below). The slats and the angled slats also include concave surfaces 206C and 208D, respectively, for accommodating pivoting movement of the securement elements 146. Other surface configurations can be used with other configurations of securement elements.

In circular saw blades, sections of interface geometries can be considered to have boundaries that may be defined by changes in the directions of adjacent individual geometries. For example, if an individual geometry closest and extending most parallel to a radius of the core, for example 204', can be considered as extending or directed in a first direction, and a next individual geometry around the perimeter in either direction and also closest and extending most parallel to a radius of the core (approximately to the same extent of "closest and extending most parallel"), for example the next geometry 204' in an adjacent section would be considered as extending in a different direction. Because interface geometries repeat in the present example, the selected individual geometries found to be closest and extending most parallel to the respective radius of the core will define the angles for their respective sections (for non-trivial interface geometries). In the present example, the transition of individual solid geometries extending in a first direction in a given section to individual solid geometries extending in a second direction in an adjacent section will help to define the boundary between adjacent sections and adjacent interface geometries.

In the present example, the transition between adjacent interface geometries occurs between adjacent solid geometries, which may be termed boundary geometries, for example between an angled slat 208 and an adjacent slat 206 (adjacent in the direction away from the other individual geometries in the same section or interface geometry). The transition is selected to occur in the cavity 220 between the angled slat 208 and the slat 206. The sections can be visualized with the phantom lines shown in FIG. 7 that are arcuately equidistant. Each section of the center core is identical to the others except for the cavities 152 in the center opening, which are more in number than the number of sections. In the present examples, the interface geometries are identical, the section angles are identical, the arcuate spans are identical and the individual solid geometries in each interface geometry are identical to respective ones in the other interface geometries. However, other alternative configurations are also possible, as discussed herein.

Working elements such as the cutting components 106 can take a number of configurations. In the example shown in FIGS. 1-4 and 15-21, the cutting components are arcuate carriers 300 having respective mounting structures 300A with interface geometries 300B over a span or length of all or part of the carrier with cutting components 300C formed or included there on. In the example of a wood saw, the cutting components can be carbide cutting tips, and in the example of a concrete saw, can be diamond composite cutting segments. Other configurations of working elements can also be used.

The cutting components 300C have a lateral thickness approximating the thickness of the blade core, for example in a wood saw. In a concrete saw, the cutting components 300C may be laterally wider. The cutting components can be selected to extend radially outward to an outer-most perimeter surface a distance of approximately 1 inch, but can be greater or lesser as desired. A one-inch range can be adequately supported by the core in the present configurations. The cutting components 300C are generally conventional, but in the present example are formed monolithic with the mounting structures 300A.

The mounting structure 300A is formed thinner than the cutting components and thinner than the overall thickness of the blade core. In the present example, the mounting structure 300A is approximately the same thickness as the center core 116. The mounting structure 300A fits into the cavity formed by the first and second outer layers 112 and 114 and the interface geometry of the center core. The cutting component 300 includes a shoulder 300D on each side of the mounting structure for receiving the exposed perimeter edge of the respective laminar layer (112, 114). The edge of the laminar layer against a shoulder 300D helps to absorb sideloading against the opposite side of the cutting component.

In the present example, the interface geometry 300B is complementary to the interface geometry of part of the core (for example where the interface geometry is repeating over the core) and includes a perimeter surface 302 coincident and complimentary with the perimeter surface 202 on the core. While there may be situations where 100% coincidence is not desired, and gaps or spacing can exist between the otherwise complementary interface geometries, the present example has the mating interface geometries substantially complementary and coincident.

Figure 17A:
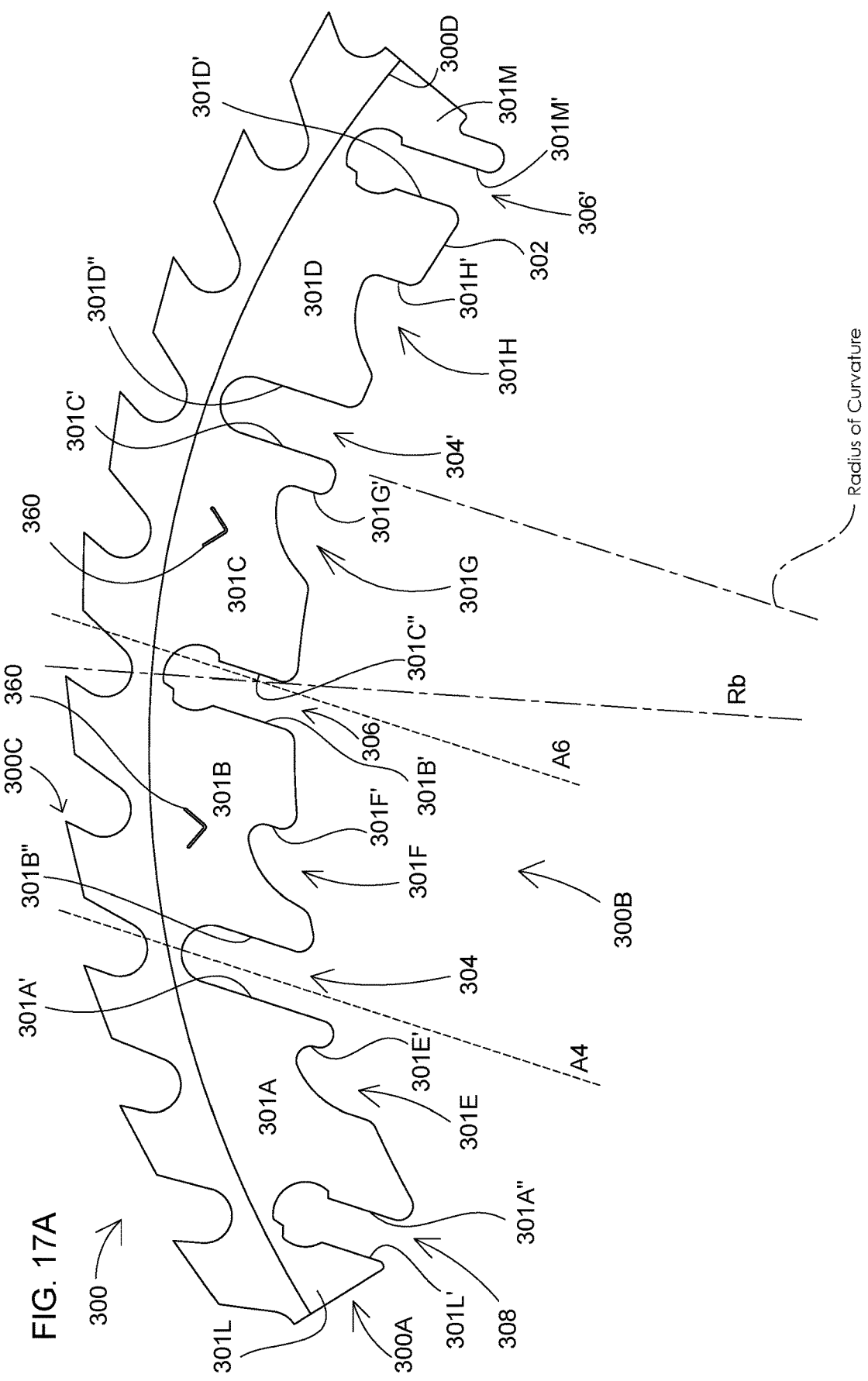

In the illustrated example, the interface geometry 300B of the carrier 300 includes a plurality of solid geometries, each having a plurality of surface geometries, and as illustrated, each of four solid geometries have a plurality of surface geometries wherein at least three surface geometries on at least one of the solid geometries are parallel to each other. Since the carrier 300 is intended for use with a circular tool, at least two of the at least three surface geometries are non-radial, though they are linear. The parallel surface geometries are noncollinear and non-coplanar as viewed in side profile. In the illustrated example, the interface geometry 300B includes first, second, third and fourth solid geometries 301A, 301B, 301C, and 301D, respectively (FIG. 17A). In the present example, none of the solid geometries in the interface geometry are exactly identical, but each solid geometry includes a wall defining a profile having a fin shape, 301E, 301F, 301G and 301H, respectively. The profiles are configured to complement the corresponding surfaces in the interface profile on the core. The fin-shaped profiles are positioned at different arcuate locations and/or orientations on the respective solid geometry relative to the other solid geometries, which makes the arrangement of surface geometries on the first solid geometry different from the arrangement of surface geometries on the second solid geometry, for example. However, each of the fin-shaped profiles include substantially straight leading walls 301E', 301F', 301G', and 301H', respectively, extending parallel to each other.

Each of the solid geometries in the illustrated example includes a leading wall and a trailing wall parallel to each other, 301A', 301A", 301B', 301B", 301C', 301C", and 301D' and 301D" and the leading and trailing walls in one solid geometry are also parallel to the leading and trailing walls of the other solid geometries. The leading and trailing walls are outside or lateral surface geometries of the solid geometries. These leading and trailing walls are also parallel to corresponding walls in the interface geometry of the core, and a trailing wall of a solid geometry in the carrier will bear against a corresponding leading wall in the core when under load. Additionally, adjacent solid geometries have their facing surface geometries parallel to each other, for example 301A' and 301B". The facing surface geometries define openings or channels for receiving complementary solid geometries from the tool. A plurality of the openings or channels are angled forward relative to a radius passing through the respective opening or channel and outward of the tool, so that those openings or channels that are angled forward are angled in the direction of motion of the tool. The walls defining channels that are angled forward in the present example include 301A", 301A', 301B", 301B', and 301C". A wall of the interface geometry on the carrier 300 may extend parallel to a radius of the tool (when the carrier is mounted on the tool, or on a radius of curvature of the carrier), or substantially parallel to a radius, in which case such wall would not be directed or angled forward or rearward relative to the direction of motion of the carrier and the tool when the carrier is mounted on the tool. Such a wall includes wall 301C', and the channel which is defined in part by the wall 301C' may also be considered to be substantially parallel to a radius of the tool and radius of curvature of the carrier. However, the wall 301C' and its channel are substantially parallel to the forwardly angled walls in the interface geometry, namely 301A", 301A', 301B", 301B', and 301C".

A wall of the interface geometry on the carrier 300 may also extend backward or rearward relative to the direction of motion of the carrier and the tool when the carrier is mounted on the tool. Such wall includes 301D' and 301M', which together define in part a channel that may also be considered to be directed rearwardly relative to the direction of motion of the carrier and the tool when the carrier is mounted on the tool, and relative to a radius passing through the channel or sidewall defining the channel. However, the walls 301D' and 301M' are parallel to other walls in the carrier 300, and the channel defined by such walls is also parallel to other channels in the carrier.

The carrier 300 also includes boundary solid geometries 301L and 301M. The boundary solid geometries provide transitions between the interface geometry of their carrier with corresponding boundary solid geometries of adjacent carriers. The boundary solid geometries 301M and 301L are leading and trailing solid geometries, respectively, on leading and trailing portions of the carrier, based on the intended direction of motion of the carrier when mounted on the tool. In the illustrated example, each boundary solid geometry includes at least one surface geometry 301L' and 301M', respectively, parallel to one or more surface geometries in the other solid geometries of the interface geometry. In the present example, they are also parallel to each other.

The present interface geometry 300B includes linearly and radially-outward extending pockets or cavities 304, 304', 306, 306' and 308 having substantially straight sidewalls. The cavities extend interior to the mounting structure 300A. Portions of the cavities extend parallel to portions of the other cavities. The fingers 204 and 204' substantially coincide with the cavities 304 and 304', with their adjacent complementary surfaces substantially contacting. Additionally, the cutting segment interface geometry 300B includes partially arcuate or fin-shaped cavities 310, 312, 314 and 316 complementary to the fins 210-216, respectively, and their adjacent surfaces substantially contact each other. The fin-shaped cavities are positioned in between adjacent ones of the cavities 304, 304', 306 or 308. When the cutting element is positioned on the core in its proper location on the section 200, the surfaces of the cavities 304, 304', 306 and 308 extend tangent to and parallel to the adjacent surfaces of the fingers, slats and angled slat.

As illustrated in FIG. 17A, the cavities 304 and 306 include respective axes A4 and A6, where A6 may be considered a first axis and A4 may be considered a second axis. Each of the first and second axes are parallel to the longitudinally walls 301C" and 301B", respectively, of their respective cavities 306 and 304. A radius of curvature Rb bisects the carrier 300. In the illustrated example, the radius of curvature Rb also intersects the axis A6, which extends at an angle in a direction toward the core and the leading portion of the carrier 300. The axis A4 also extends at an angle in a direction toward the core and toward the leading portion of the carrier relative to a radius of curvature (not shown) intersecting the opening 304.

One or more of the cavities, and in the present example, three of the cavities 306 and 308, include cavity surface configurations for engaging with a securement or locking element. Engagement surfaces help to secure the cutting element on the core. An end of the interface profile includes at least one engagement surface, for example the leading end of the cutting element in the direction of rotation of the blade, and in the illustrated example engagement surfaces are included at each end of the cutting element interface. The illustrated example also includes an additional or intermediate engagement surface for additional strength in securing the cutting element on the core. Additional engagement surfaces can be provided and distributed over the interface geometry to help in withstanding the loading against the cutting element.

At least one of the cavities (306, 308) includes at least one engagement surface 350 and, in the illustrated embodiment two engagement surfaces 350 and 352 (FIG. 19). The cavity configurations with the engagement surfaces 350 and 352 are substantially identical between cavities 306 and 308. The engagement cavity configurations are positioned at the end of their respective cavities 306 and 308, and includes first and second arcuate portions 354 and 356. The arcuate portions 354 and 356 allow the securement elements (146 described more fully below) to pivot within the ends of the cavities. Pivoting in a clockwise direction, as the structures would be viewed in FIG. 19, would continue until adjacent surfaces of the securement elements come into contact with respective ones of the engagement surfaces 350 and 352. The arcuate portions 354 and 356 fall on an imaginary circle centered preferably on the pivot axis of the securement element. The engagement surfaces 350 and 352 form stop surfaces for the securement elements, and extend at respective angles to a centerline for the linearly-extending cavity 306 or 308, respectively. The angles are such that a securement element will pivot less than 90° before contacting the engagement or stop surfaces 350 and 352.

The cutting element also includes darts or arrows 360 formed on, in or through the mounting structure 300A of the cutting element. The arrows are used to align with corresponding arrows 148 on the first and second laminar layers to properly position the cutting element in the cavity between the laminar layers and inter-engaging with the interface geometry of the center core.

Figure 4:
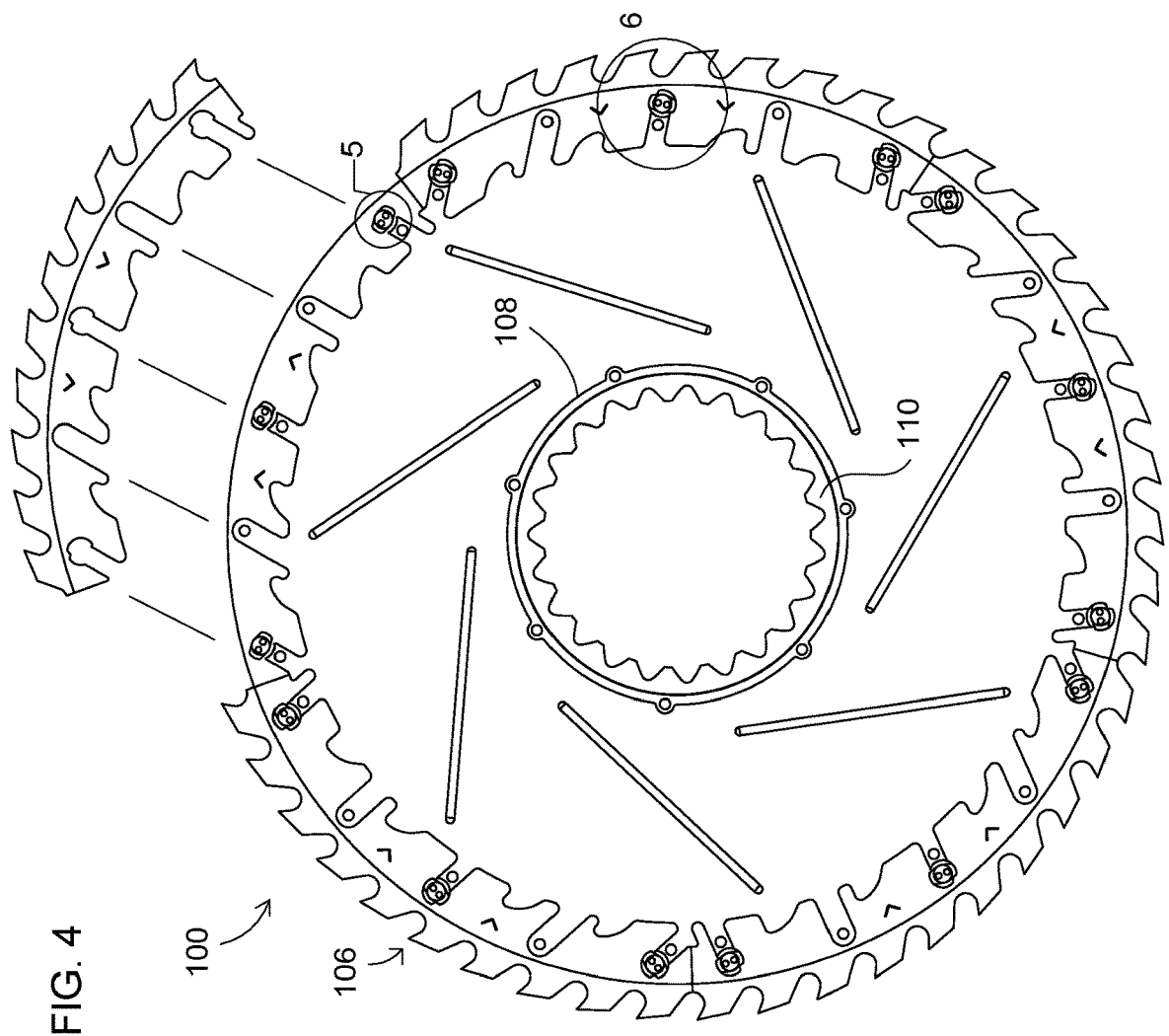
FIG. 4 is a plan view of part of the blade of FIG. 1 with a laminar element removed so that a core and cutting elements are visible and with a cutting element separated from the blade.

The securement element 146 (FIGS. 1-6 and 12-14) can take a number of configurations. The securement elements can be a pivoting lock, a sliding latch, and engaging pawl, or other configurations. In the present example, the securement element 146 is a pivoting structure sandwiched between the first and second laminar layers of the core with portions extending and fitting into openings therein. For example, the securement element 146 is a lock having substantially symmetric surfaces and a manual or tool engaging surface. The locking includes an eccentric planar element 400 and 402 bisecting a body portion 404 having a cylindrical shape. The body portion forms first and second boss structures 406 and 408 extending outward from the planar element so as to fit into and engage respective openings in respective laminar layers of the core. The boss structures allow the lock to pivot within the openings and are shaped complementary to the openings. The planar element extends between the first and second laminar layers. Each end of the planar element includes arcuate surfaces 410 and 412 for traveling along the corresponding arcuate surfaces 354 and 356 (FIG. 19) in the locking cavities. Each side surface of the planar element includes respective stop surfaces 414, 416, 418 and 424 contacting adjacent stop surfaces in the securement cavity. When the lock pivots clockwise, for example as viewed in FIGS. 6 and 13, stop surfaces 414 and 418 contact the adjacent surfaces 350 and 352, respectively, in a locked position. The lock thereby locks the cutting element to the core. When the lock is pivoted counterclockwise, the stop surfaces 416 and 420 contact the stop surfaces 358 and 359, respectively (FIG. 19), to unlock the lock. The planar elements 400 and 402 are then aligned with the respective cavity in the cutting element (306 or 308) and the cutting element can be disengaged from the core (when all associated locking elements are unlocked) by moving the cutting element linearly outward as depicted in FIG. 4.

The securement elements 146 can be manipulated manually, depending on their structure, or with a suitable tool, such as a spanner wrench, two-pronged driver (screwdriver or socket driver adapted to have to longitudinally-extending prongs) or other tool for engaging the openings 422 on a boss of the lock. Other configurations can be used as well.

With the interface geometries described herein, or others wherein a cutting element is loaded to set down and against geometry surfaces forming an acute angle with adjacent tangents, the loading is taken up by the various geometries. As a result, locking elements, for example at the ends of slats as described herein, are not heavily loaded and are more reliable to withstand normal operating conditions.

Each cutting element can be aligned with corresponding arrows on the core and inserted into the cavity between the first and second outer layers of the core and secured in place with respective locks 146. Each cutting element can be mounted and secured in a similar manner. One or more cutting elements can be removed by reversing the steps, for example to replace a damaged cutting element or to reconfigure the blade by replacing all of the cutting elements. For example, a blade configuration can be changed by changing the types of cutting elements. Alternatively, a blade configuration can be changed by changing the sizes of the cutting elements for example by installing carriers having longer or shorter mounting structures, thereby changing the overall diameter of the final blade.

A blade core can be assembled by placing adhesive on the center core and positioning the hub element and the locking elements in their respective openings or cavities in an outer laminar layer. Rivet openings in the center core and the laminar layer are then aligned, and the strengthening members positioned in their respective cavities. The opposite outer laminar layers then placed in registration on the center core and the assembly secured together, for example through rivets or other fasteners. A final core can then be assembled with cutting elements and shipped or shipped separately so the user can assemble the desired cutting elements on the core.

As depicted schematically in FIG. 4, a removable component can be assembled onto a perimeter of the core by aligning the interface geometry of the component with a complementary interface geometry on the core. The removable component is then translated in a direction parallel to a chord of the core (an imaginary line in the removable component will be collinear with and move along a radius of the core) until the complementary interface geometries engage, and the mounting structures 300A extend between and are sandwiched by the adjacent interior surfaces of the outer layers 112 and 114. When the complementary interface geometries are securely seated with respect to each other, the locking elements 146 can be engaged. In the present examples, the locking elements help to load the removable component in the core.

In the illustrated configuration of FIG. 4, a given complementary removable component can be placed at any of the five positions around a perimeter of the core and secured in place. Five substantially similar removable components can be mounted to and secured in the core for use. If a removable component is damaged, it can be removed and replaced. If the blade configuration is to be changed, for example by changing the width or other configuration of the cutting elements, the removable component can be removed and replaced by removable components having the desired configuration.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A removable component for a tool wherein the removable component is adapted to support at least one working component for the tool, the removable component comprising:
a support structure having a first support portion configured to support a working component, the support structure further including an engagement portion having an interface geometry wherein the engagement portion is configured to be mounted on a tool for movement in a first direction wherein the removable component includes a leading portion that precedes in motion of the tool a trailing portion of the removable component, and wherein the engagement portion includes a plurality of walls in a perimeter portion of the engagement portion defining respective at least first and second openings for engaging a complementary portion of the tool and wherein at least first and second walls of the plurality of walls extend at angles in a direction toward the support portion and toward the leading portion and wherein the first and second openings have different geometries from one another.

2. The removable component of claim 1 further including walls defining a third opening and wherein the first and third openings are substantially parallel to each other.

3. The removable component of claim 2 wherein a second plurality of walls help to define the second opening and wherein a wall in the second plurality of walls is parallel to a wall in a plurality of walls defining the first opening.

4. The removable component of claim 1 wherein the interface geometry has at least one solid geometry wherein the at least one solid geometry includes sidewalls extending parallel to each other and wherein the at least one solid geometry includes a further wall extending parallel to the sidewalls.

5. The removable component of claim 1 wherein the interface geometry includes first and second solid geometries each having sidewalls extending parallel to each other, wherein the first and second solid geometries have respective sidewalls that face each other and that are parallel to each other, and wherein each of the first and second solid geometries include respective surface geometries intermediate the respective sidewalls of the respective solid geometry, and wherein each intermediate surface geometry includes a wall parallel to the sidewalls of the respective solid geometry.

6. The removable component of claim 5 wherein the first and second solid geometries are different from each other in side profile.

7. A removable component for a tool wherein the removable component is adapted to support at least one working component for the tool, the removable component comprising:
a support structure having a first support portion configured to support a working component, the support structure further including an engagement portion having an interface geometry wherein the engagement portion is configured to be mounted on a tool for movement in a first direction wherein the removable component includes a leading portion that precedes in motion of the tool a trailing portion of the removable component, and wherein the engagement portion includes a plurality of walls in a perimeter portion of the engagement portion defining an opening for engaging a complementary portion of the tool and wherein at least first and second walls of the plurality of walls extend at angles in a direction toward the support portion and toward the leading portion, wherein the interface geometry includes first and second solid geometries each having sidewalls extending parallel to each other, wherein the first and second solid geometries have respective sidewalls that face each other and that are parallel to each other, and wherein each of the first and second solid geometries include respective surface geometries intermediate the respective sidewalls of the respective solid geometry, and wherein each intermediate surface geometry includes a wall parallel to the sidewalls of the respective solid geometry, wherein each of the first and second solid geometries extend from respective locations adjacent the first support portion away from the first support portion to their respective intermediate surface geometries.

8. The removable component of claim 1 further including at least one working component on the first support portion.

9. The removable component of claim 8 wherein the at least one working component is a plurality of cutting elements mounted continuously over the first support portion from the leading portion to the trailing portion and wherein the cutting elements are carbide tips.

10. The removable component of claim 1 wherein the interface geometry includes an opening for receiving a pivotable locking element.

11. The removable component of claim 1 wherein the interface geometry includes surface geometries defining more than three slots.

12. A removable component for a tool wherein the removable component is adapted to support at least one working component for the tool, the removable component comprising:
a support structure having a first support portion configured to support a working component, the support structure further including an engagement portion having an interface geometry wherein the engagement portion is configured to be mounted on a tool for movement in a first direction wherein the removable component includes a leading portion that precedes in motion of the tool a trailing portion of the removable component, and wherein the engagement portion includes a plurality of walls in a perimeter portion of the engagement portion defining an opening for engaging a complementary portion of the tool and wherein at least first and second walls of the plurality of walls extend at angles in a direction toward the support portion and toward the leading portion, wherein the arcuate removable component extends from the leading portion to the trailing portion through a middle portion half way between the leading and trailing portions and wherein the interface geometry includes a radial wall extending parallel to a radius of curvature of the arcuate removable component and wherein the radial wall is spaced arcuately away from the middle portion.

13. The removable component of claim 12 wherein the radial wall is positioned between the middle portion and the leading portion.

14. The removable component of claim 12 further including a first plurality of walls parallel to the radial wall and between the radial wall and the trailing portion, and a second plurality of walls parallel to the radial wall and between the radial wall and the leading portion, and wherein there are more parallel walls in the first plurality than in the second plurality.

15. A removable component for a tool wherein the removable component is adapted to support at least one working component for the tool, the removable component comprising a support structure having a first support portion configured to support a working component, the support structure further including an engagement portion having an interface geometry wherein the engagement portion is configured to be mounted on a tool for movement in a first direction wherein the removable component includes a leading portion that precedes in motion of the tool a trailing portion of the removable component, and wherein the engagement portion includes a plurality of walls defining an opening for engaging a complementary portion of the tool, wherein at least first and second walls of the plurality of walls extend at angles in a direction toward the support portion and toward the leading portion, and wherein the removable component extends from a first end to a second end and wherein the removable component can be divided by a line bisecting the removable component between the first and second ends into a leading half and a trailing half, wherein the leading and trailing halves have respective solid geometries and a solid geometry in the leading half is different than a solid geometry in the trailing half.

16. The removable component of claim 15 wherein the removable component includes an even number of working elements and the interface geometry is asymmetric about the bisecting line.

17. The removable component of claim 15 wherein all of the solid geometries in the leading half are different from the solid geometries in the trailing half.

18. The removable component of claim 5 wherein the first and second solid geometries are different shapes from each other.

19. A removable component for a tool wherein the removable component is capable of supporting at least one working component for the tool, the removable component comprising:
a support structure having a first support portion configured to support a working component, the support structure further including an engagement portion extending arcuately and the engagement portion has an interface geometry configured such that the engagement portion can be mounted on a tool for movement in a first direction, wherein the removable component includes a leading portion that precedes in motion of the tool a trailing portion of the removable component, and wherein the engagement portion includes a respective plurality of walls defining at least first and second openings each of which extend at least in part longitudinally parallel to respective first and second axes for engaging a complementary portion of the tool, wherein the first and second axes extend at angles in a direction toward the support portion and toward the leading portion relative to respective radii of curvature intersecting the respective openings, and wherein a radius of curvature bisecting the support structure is closer to the first axis than to the second axis and non-parallel to the first axis.

20. The removable component of claim 19 wherein the first and second axes are parallel to each other.

21. The removable component of claim 20 further including walls defining a third opening extending longitudinally along a third axis parallel to the first and second axes.

22. The removable component of claim 19 wherein the first and second openings have respective geometries in side view different from each other.

23. The removable component of claim 19 wherein the engagement portion further includes walls defining a third opening having an arcuate wall extending toward the support structure joining a straight wall extending toward the support structure.

24. The removable component of claim 23 wherein the straight wall is closer to the leading portion than is an end of the arcuate wall spaced apart from the straight wall.

25. A removable component for a tool wherein the removable component is capable of supporting at least one working component for the tool, the removable component comprising:
a support structure having a first support portion configured to support a working component, the support structure further including an engagement portion extending arcuately and the engagement portion has an interface geometry configured such that the engagement portion can be mounted on a tool for movement in a first direction, wherein the removable component includes a leading portion that precedes in motion of the tool a trailing portion of the removable component, wherein the engagement portion includes a plurality of interior surfaces forming an arc extending between the leading portion and the trailing portion, and wherein the engagement portion includes a plurality of walls defining at least first and second openings each of which extend away from the arc toward the support structure, wherein the first opening includes first and second substantially parallel walls extending away from the arc and toward the support structure, and wherein the second opening includes nonparallel walls extending away from the arc and toward the support structure.

26. The removable component of claim 25 wherein a second opening first wall extends parallel to the first opening first wall.

* * * * *